United States Patent [19]
Volmer

[11] Patent Number: 5,950,352
[45] Date of Patent: Sep. 14, 1999

[54] FISHING EQUIPMENT CARRYING SYSTEM

[76] Inventor: Jason R. Volmer, P.O. Box 33239, Denver, Colo. 80233-0239

[21] Appl. No.: 08/926,824

[22] Filed: Sep. 10, 1997

Related U.S. Application Data

[60] Provisional application No. 60/025,185, Sep. 11, 1996, abandoned.

[51] Int. Cl.⁶ ..................................................... A01K 97/06
[52] U.S. Cl. ...................... 43/54.1; 43/57.1; 206/315.11; 220/23.4
[58] Field of Search ................................. 43/1, 4.5, 57.1, 43/54.1; 206/315.11, 387.1, 387.15; 220/23.4, 23.91

[56] References Cited

U.S. PATENT DOCUMENTS

| | | |
|---|---|---|
| 444,272 | 1/1891 | Benn . |
| 3,346,313 | 10/1967 | Fee . |
| 4,691,469 | 9/1987 | Alsobrook et al. ....................... 43/54.1 |
| 4,829,699 | 5/1989 | Perkins ...................... 43/57.1 |
| 4,958,730 | 9/1990 | Bunten ............... 206/315.11 |
| 5,052,555 | 10/1991 | Harmon ............................ 206/315.11 |

FOREIGN PATENT DOCUMENTS 214386  4/1924  United Kingdom .

*Primary Examiner*—Jack W. Lavinder
*Attorney, Agent, or Firm*—Ramon L. Pizarro; Edwin H. Crabtree

[57] ABSTRACT

A system and method for carrying fishing equipment to the field by a person. The system includes the use of at least one module that can accept at least one container for holding fishing equipment. The module further includes mating components that allow attachment of one module to another module. A case adapted for receiving at least one module is also used together with a wallet that has been adapted for removably accepting at least one tray for holding fishing equipment. The wallet has also been adapted for being held within the module, and at least one tray for accepting fishing flies, the tray being adapted for mounting in the wallet, so that a tray being transported in the container for holding fishing equipment and in the container transported in the module may be removed from the container and then received by the wallet, so that a user may combine and carry a desired set of modules holding containers for holding fishing equipment, each container holding at least one tray for accepting flies, and then transfer a desired tray to the wallet, so that the being carried within the wallet may be varied by replacing the tray.

20 Claims, 32 Drawing Sheets

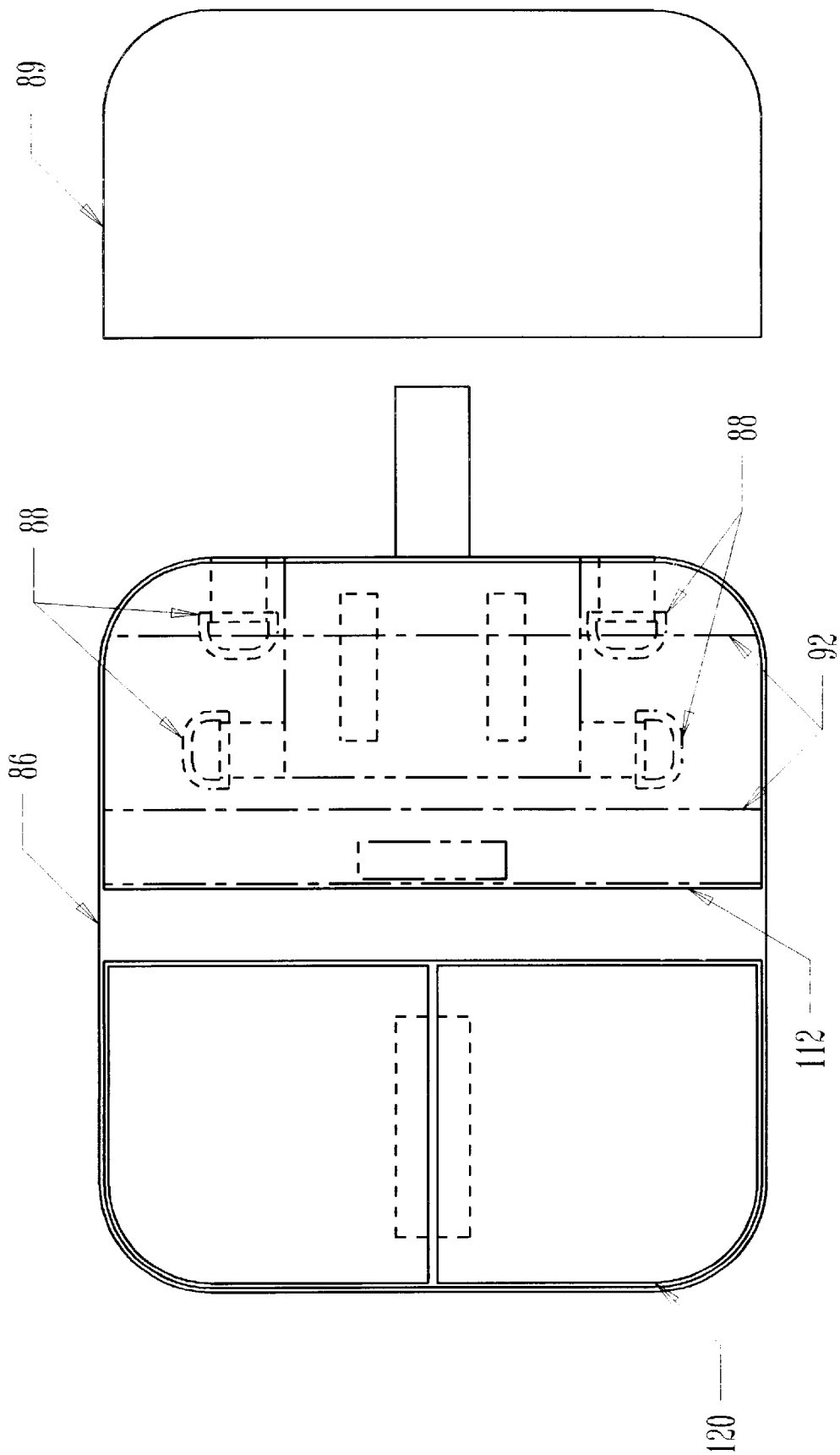

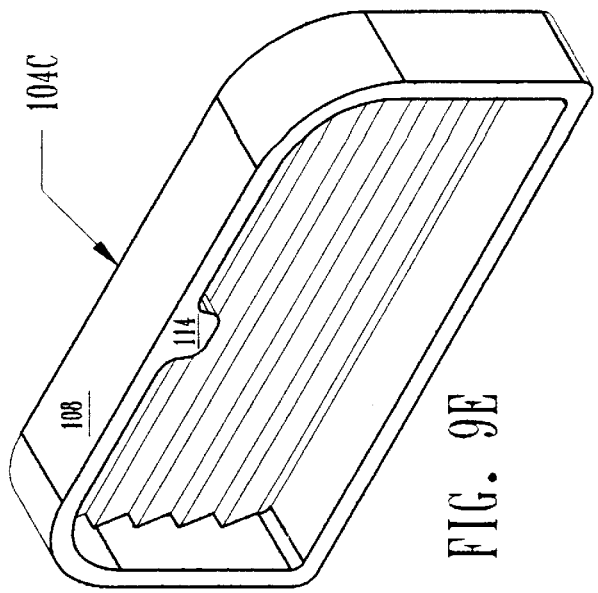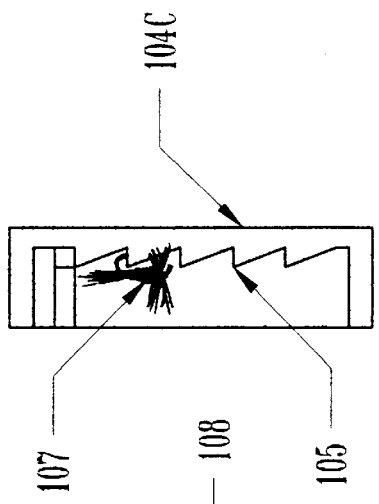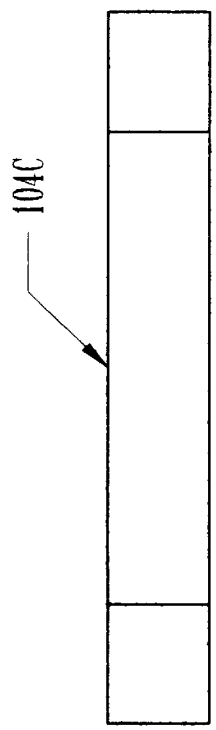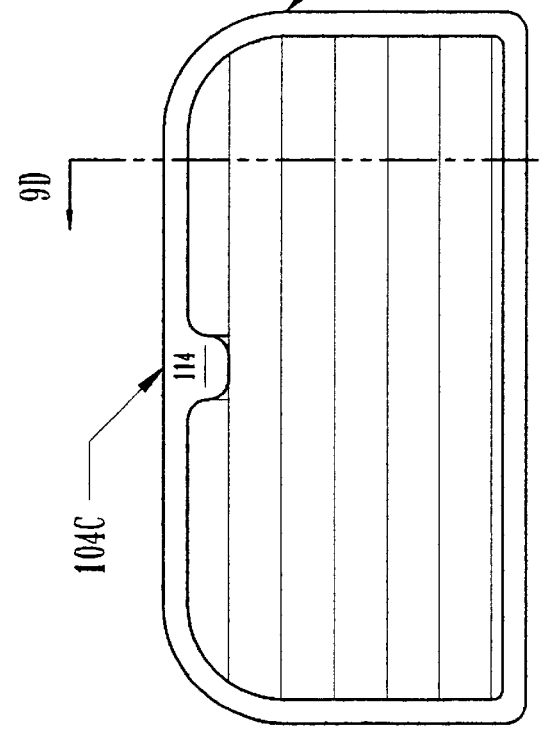

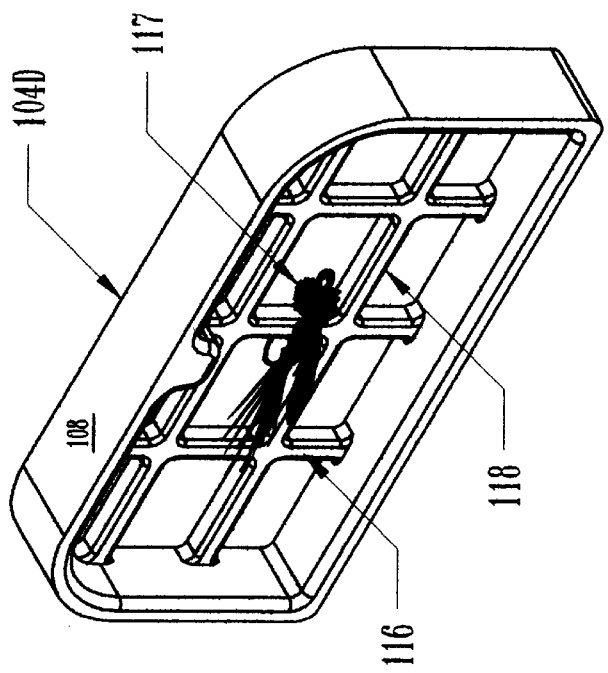
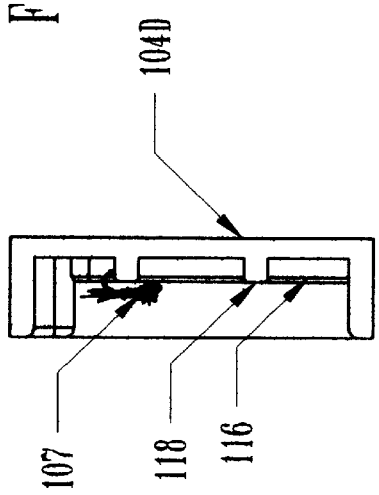
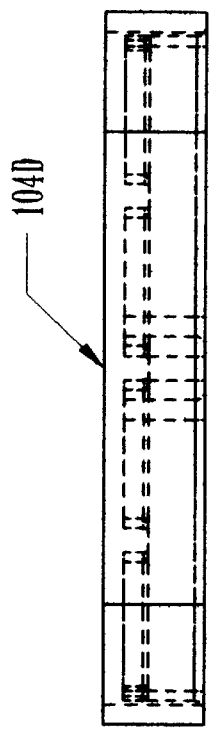
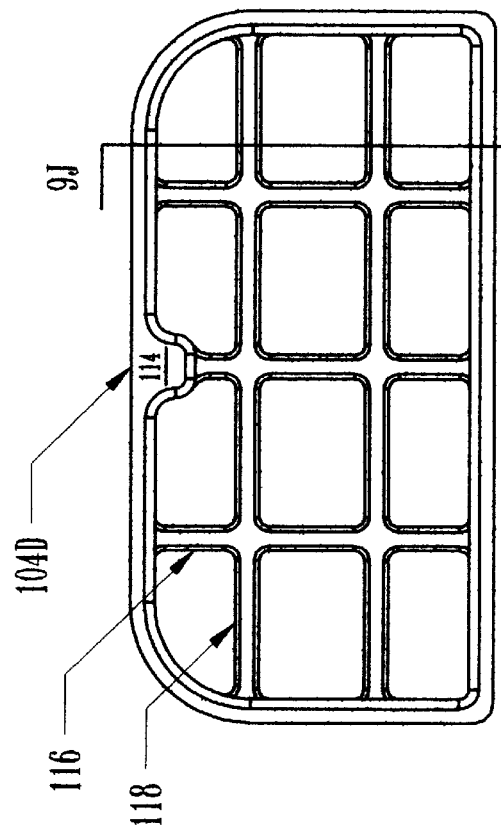

FISHING EQUIPMENT CARRYING SYSTEM

CROSS REFERENCE TO RELATED APPLICATIONS

This application claims the benefit of U.S. Provisional Application No. 60/025,185 filed Sep. 11, 1996, now abandoned.

BACKGROUND OF THE INVENTION (a) Field of the Invention

This invention generally relates to field of devices for carrying fishing equipment, and more particularly, but not by way of limitation, to a system for carrying fishing equipment which is adaptable for carrying various fishing equipment.

(b) Discussion of Known Art

In the sport of fishing, and particularly in the sport of fly fishing, one of the most important skills that a fisherman must develop is his ability to select the fly or lure which will get the best response from the fish in the area that he is fishing. This is due to the fact that fish may favor certain kinds of food sources depending on the season, on the weather, on temperature of the water, and on the kinds of insects and other food that is found in the area at the time.

Therefore, to be effective, a fisherman must have available to him fishing lures, or flies, which match the kind of food being consumed by the fish sought by the fisherman. Often, the fisherman is fishing waters which are at remote locations or at areas which are unfamiliar to the fisherman. Therefore, in order to have a productive fishing trip, the fisherman must carry a wide assortment of fishing tackle and equipment in order to ensure that he has the right fly or lure for the fish at his destination. This means that the fisherman must begin his trip with a large assortment of lures and flies. However, when the fisherman arrives at the fishing destination he will quickly survey the area to determine what insects and other foodstuffs for fish are present in the area. The fisherman will then draw flies or lures which closely resemble the local fish food sources from his assortment of artificial flies and lures.

Thus, when the fisherman arrives at the site, he no longer needs to carry the large assortment of fishing gear with which he started his trip, but now only needs to carry the equipment which he has selected for the local conditions and fish food and fish eating habits.

There remains a need for a versatile system which permits the fisherman to carry a wide variety of fishing equipment to the field, and then also permits the fisherman to reduce the equipment that he is going to carry on his person while fishing.

There remains a need for a system for allowing the fisherman to taylor the equipment carrying system to carry the equipment that is anticipated and to be needed at the fishing site and which can be tailored to suit the fisherman's style of fishing.

There remains a need for a fishing system which can use a few components to form a multitude of different arrangements, each tailored for the conditions anticipated at the fishing site, as well as allow the user to customize his equipment carrying system to suit his particular style of fishing. For example, some fishermen may like to try a few fly patterns in different sizes and colors, while others may like to carry a large variety of different lures and flies and vary the presented fly or lure frequently.

There remains a need for a system for carrying fishing equipment, in particular fly fishing equipment, that can be quickly and easily tailored at the field, so that the user need only carry the flies and equipment that he needs at the field.

SUMMARY

It has been discovered that the above problems, which had been left unsolved by the known prior art, can be solved by providing a fishing equipment carrying system which includes the following elements:

a) a case adapted for receiving several interlocking modules, each module being adapted for receiving several fly boxes or adapted for receiving fishing reels, extra spools, fly lines, fly rods, and for holding interchangeable fly plates and trays;

b) a waist pack having straps for attachment of the pack around the user's waist and adapted for receiving at least one of the modules used with the case, as well as having means for accepting an interchangeable fly plate, and thereby allowing the user to carry a variety of fly boxes within the module;

c) a fishing wallet which can be attached to the front of a user's chest waders and/or hung from a user's neck and/or attached to a user's wading belt, the wallet includes means for removably accepting interchangeable plates which hold flies or other fishing lures as well as the fly boxes that fit into the modules that fit into the case and into the waist pack;

d) a holster that includes means for attaching the holster on a wading belt or to a user's chest waders, the holster is adapted for receiving at least one of the fly boxes or combinations of the fly boxes; and e) at least one set of leg supports adapted for attachment to the modules, so that the modules, together with the fly boxes, may be used to form a desktop holding cabinet that stores the fly boxes while the user ties or modifies flies to be carried in the fly boxes. It is contemplated that the fly boxes may also be modified to hold fly tying equipment as well, and therefore allowing the formation of a complete, miniature work station; and f) a notebook which holds several interchangeable plates as well as several fly trays.

Thus, it can be appreciated that an important feature of the invention is the provision of interlocking modules. In a preferred embodiment the interlocking feature is accomplished by providing mating male and female track sections on the external faces of walls of the modules.

It is also important to note that each of the modules can be designed accept any one of a variety of fly boxes. Thus, in a preferred embodiment of the modules can accommodate three standard fly boxes with a mean thickness of one and one half inches, or in another embodiment of the modules the modules can accept six fly boxes with a mean thickness of three quarter's of an inch. Some of the most popular configurations of fly boxes are fly boxes which are approximately four inches wide, by five and three quarters of an inch long, by one and one half inches in depth, another popular configuration is of fly boxes which are approximately three and one-quarter inches wide, by four and one-quarter of an inch long, by or three-quarters of an inch in depth.

The waist pack has straps for attachment of the pack around the user's waist or chest and is adapted for receiving at least one of the modules used with the case as well a one interchangeable fly tray in the waist pack's lid-type cover portion. Thus the waist pack attaches to the user's waist much like the well known "fanny pack" or to the user's chest, like the well known "chest pack". However in a highly preferred embodiment of the invention the waist pack also includes strap attachments which allow the user to install a strap that allows the main compartment of the waist pack to hang over the user's chest, and thus allowing the user to attach the waist pack around his chest, using both the waist belt of the waist pack and the neck strap of the waist pack. It is preferred that the waist pack have a lid-type opening cover which opens away from the user's body, so that the user may advantageously use the lid-type cover to provide a surface for holding or attaching an interchangeable fly plate, or just resting flies or other equipment used in attaching the flies to the fishing line. It should be noted that this configuration of the waist pack allows unimpeded access to the fly boxes in the module or to the readily exposed interchangeable fly plate, while also providing a work surface.

As indicated above, an important component of the system disclosed herein is the inclusion of a fishing wallet which can be attached to the front of a user's chest waders and/or hung from a user's neck, or attached to a belt. In a preferred embodiment of the wallet, the wallet is made from a flat pliable material and comes in two sizes, one of approximately twelve inches in width by eleven and one-half inches in height, and another of approximately nine inches in width by ten and three-quarter inches in height, so that when folded at approximately mid-span along the height dimension, the wallet measures approximately five and three-quarters of an inch by eleven inches and the other four y nine inches, respectively. Thus the folded wallet provides two surfaces each with enough area to support removeable platforms, or plates, each having a footprint of eight and three-quarter inches by four and one-half inches. The means for removably accepting these interchangeable plates may preferably be hook and loop type material of the type commonly sold under the trademark Velcro.

The removeable plate can include fleece material or foam type material in order to hold flies or other fishing lures within the wallet. Additionally, it is contemplated that the same footprint of the removeable plate can be used to form fly trays. The fly tray will preferably include a pair of compartments defined by a bottom having a footprint that is substantially the same as the footprint of the removeable plate, a perimetral wall which runs along the perimeter of the bottom, and a center divider panel, which divides the interior of the perimeter wall into two substantial equal mirror images of one another. The perimetral wall is approximately one inch in height and serves as a protective spacer which prevents the sides of the wallet or other holding device from contacting and deforming flies stored on the fly tray.

It is important to note that since some of the most popular fly boxes are typically five and three-quarters to six inches long by four inches wide, by three quarters to one an one-quarter inches deep, or four and one-quarter inches wide by three and one-quarter inches long by three quarter's of an inch deep, the removeable plate can be manufactured with a pliable pocket which can accept any of these popular fly boxes. This allows the user to change the configuration of the inside of the wallet form one which holds a fly tray to one which holds a plate which includes a pocket for a popular fly box.

Also, it is important to note that by providing a folded wallet that can be hung around the user's neck, one can also use the same configuration of the wallet to provide a working surface for the fisherman by simply providing a strap that limits the unfolding of the wallet to a position where the unfolding side of the wallet forms a surface that is substantially perpendicular to the user's chest, and thereby forming a work surface for the user.

Another important aspect of the instant invention is the addition of a holster that is adapted for receiving a popular size fly box, and which includes means for attaching the holster to the upper user's chest waders. In a preferred embodiment the holster is made from a pliable material which holds the fly box against the holster. Thus, if a fisherman discovers that all of the flies that are needed for fishing a particular are contained in a single fly box, he may simply pull that fly box and take only that fly box in the holster to the field.

Thus, it is an important aspect of the system is that by using modules with means for interconnecting the modules to one another, one may further enhance the usefulness and versatility of the system by simply adding at least one set of leg supports adapted for attachment to the modules. The leg supports would attach to the means for interconnecting the modules, and thus forming a miniature chest with drawers formed by the fly boxes. This miniature chest provides the fisherman with a convenient holding device to keep the fly boxes organized while he works on modifying his existing flies to better match insects and other fish food in the area. Once the fisherman is finished with the modifications to the flies, a process which is commonly referred to as "dressing up" the flies.

Thus it can be appreciated that with instant invention a user may customize the equipment he takes to the field by simply varying a few interchangeable components.

Also, it can be appreciated that with the instant invention a manufacturer can provide his customers with a basic wallet which may be customized by the client to suit his individual needs. Thus the instant inventions allows the forming of a large variety of specialized equipment, using a few interchangeable components. This feature is also highly advantageous to the manufacturer who can use this system to provide a variety of fishing equipment made from a few components. Thus this will reduce the manufacturer's inventories, manufacturing and set up costs, and distribution costs.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is a perspective view of a case holding six modules, two modules, each holding three one and one-half inch thick fly boxes, and two modules each holding six fly boxes, each fly box being three quarters of an inch thick, and two modules that have been adapted for holding a fly fishing reel and a spare spool each. A top compartment is also incorporated into the lid of the case to allow the user to carry additional equipment, such as extra fly wallets, holsters, vests, and other fishing equipment.

Figure 1:
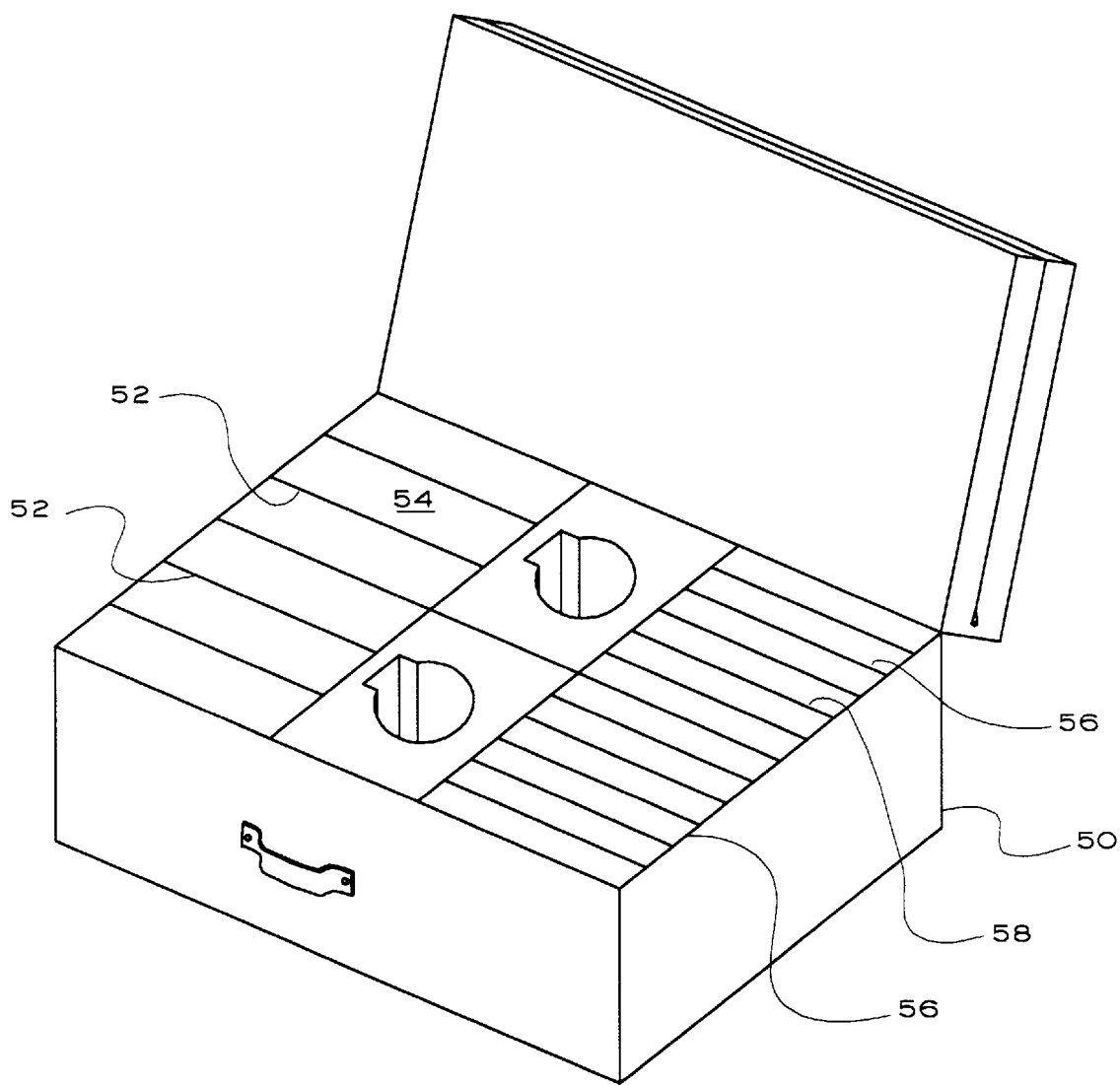

FIG. 9A is a production type drawing of a wallet used with the instant invention. The wallet is shown with attachments used incorporating a neck strap as well as a chest strap to hold the wallet against the user's chest, and a clips for attaching the wallet to the user's belt or waders. The drawing also shows the outline of the footprint of the interchangeable plates and the preferred location of hook and loop material, such as the type sold under the brand name Velcro, for attaching the interchangeable plates to the wallet.

Figure 9:
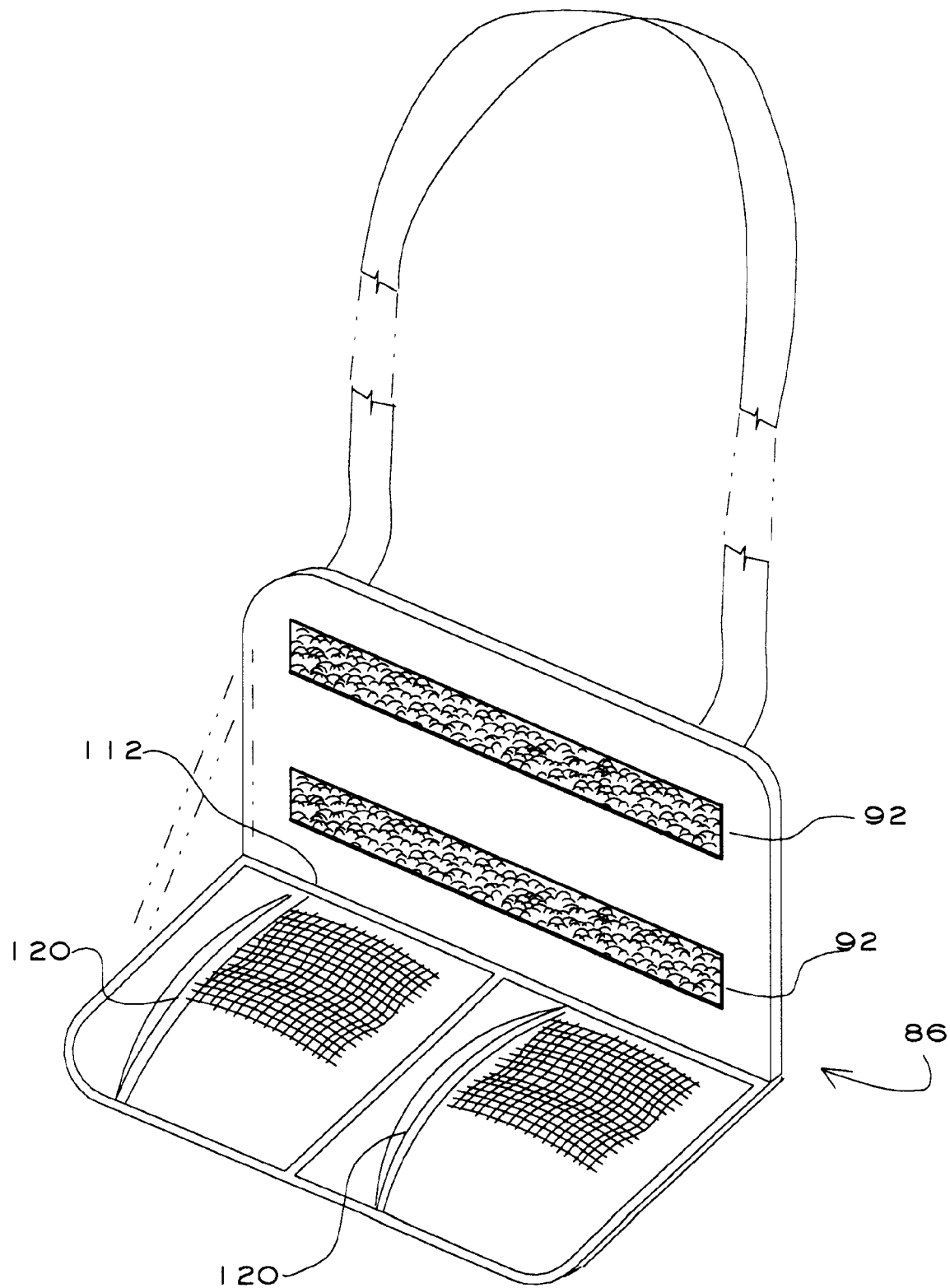
FIG. 9 is a perspective view of a wallet used with the instant invention. The wallet is shown used with a strap that holds a portion of the wallet at a substantially perpendicular orientation to the user's chest.

FIG. 9B is a side view from a production type drawing of a foam insert or unitary foam tray that has been adapted for use with a wallet as shown on FIG. 9.

FIG. 9C is a top plan view of the foam tray shown on FIG. 9B.

FIG. 9D is a sectional view of the foam tray shown on FIG. 9C taken from the location shown on FIG. 9C.

FIG. 9E is a perspective view of the foam tray shown on FIGS. 9B through 9D.

Figure 9G:
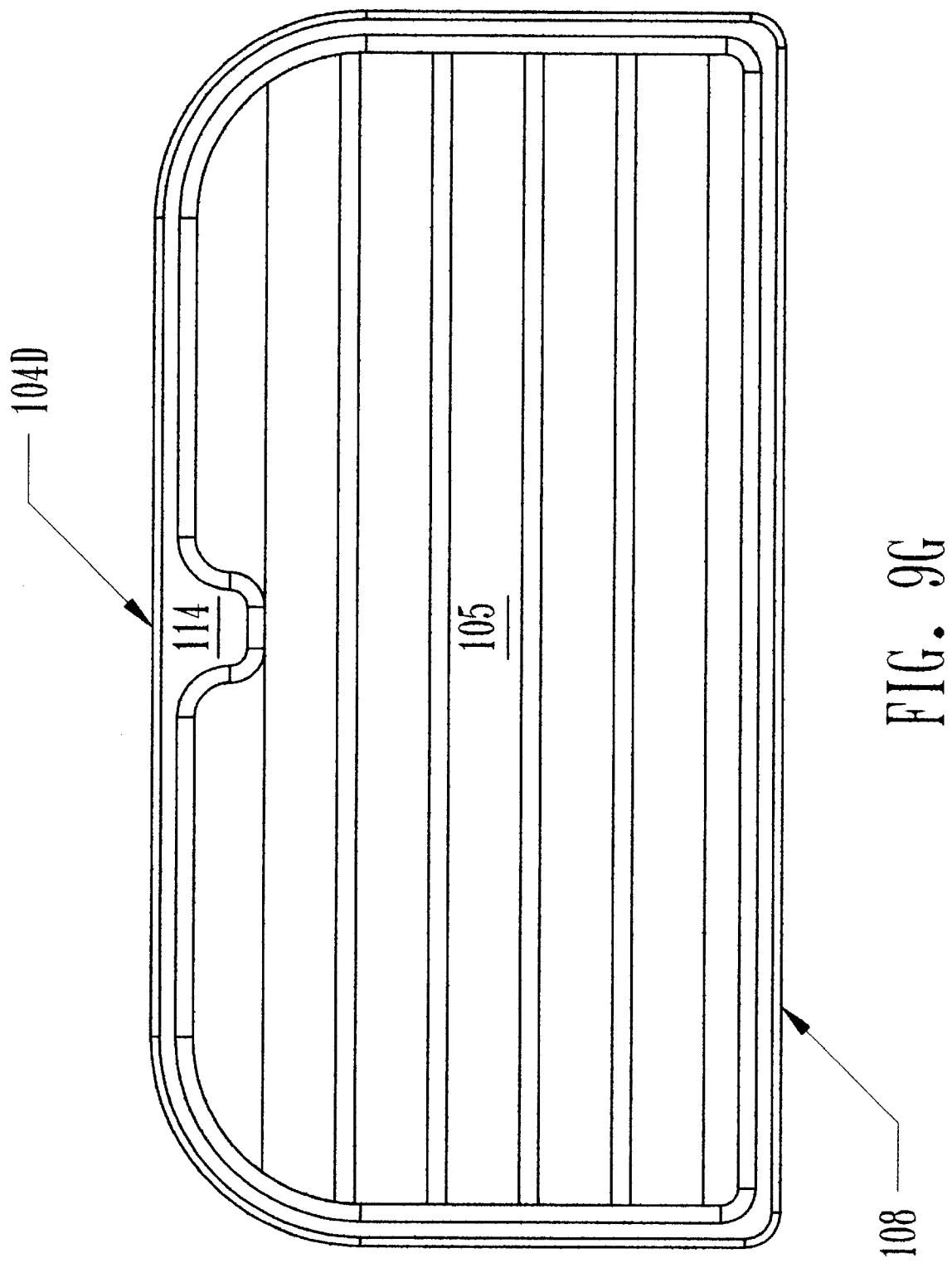

FIG. 9G is an enlarged view of FIG. 9C.

FIG. 9H is a side view of a production type drawing of a foam tray that has been adapted for use with a wallet as shown on FIG. 9. The foam insert including vertical and horizontal ridges for mounting flies.

FIG. 9I is a top plan view of the foam insert shown on FIG. 9H.

FIG. 9J is a sectional view of the foam tray shown on FIG. 9I taken from the location shown on FIG. 9I.

FIG. 9K is a perspective view of the foam tray shown on FIGS. 9H through 9J.

Figure 9L:
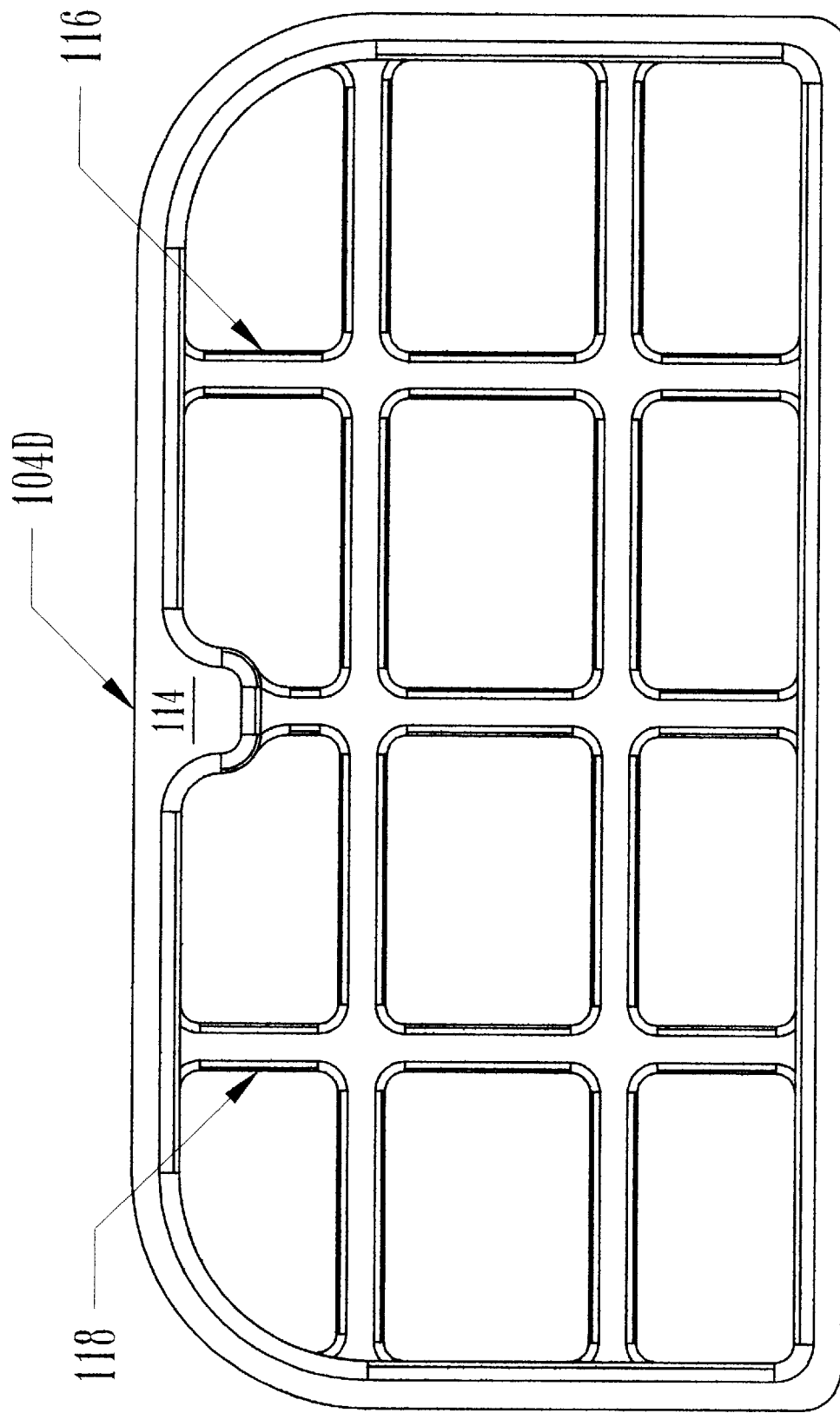

FIG. 9L is an enlarged view of FIG. 9I.

Figure 10:
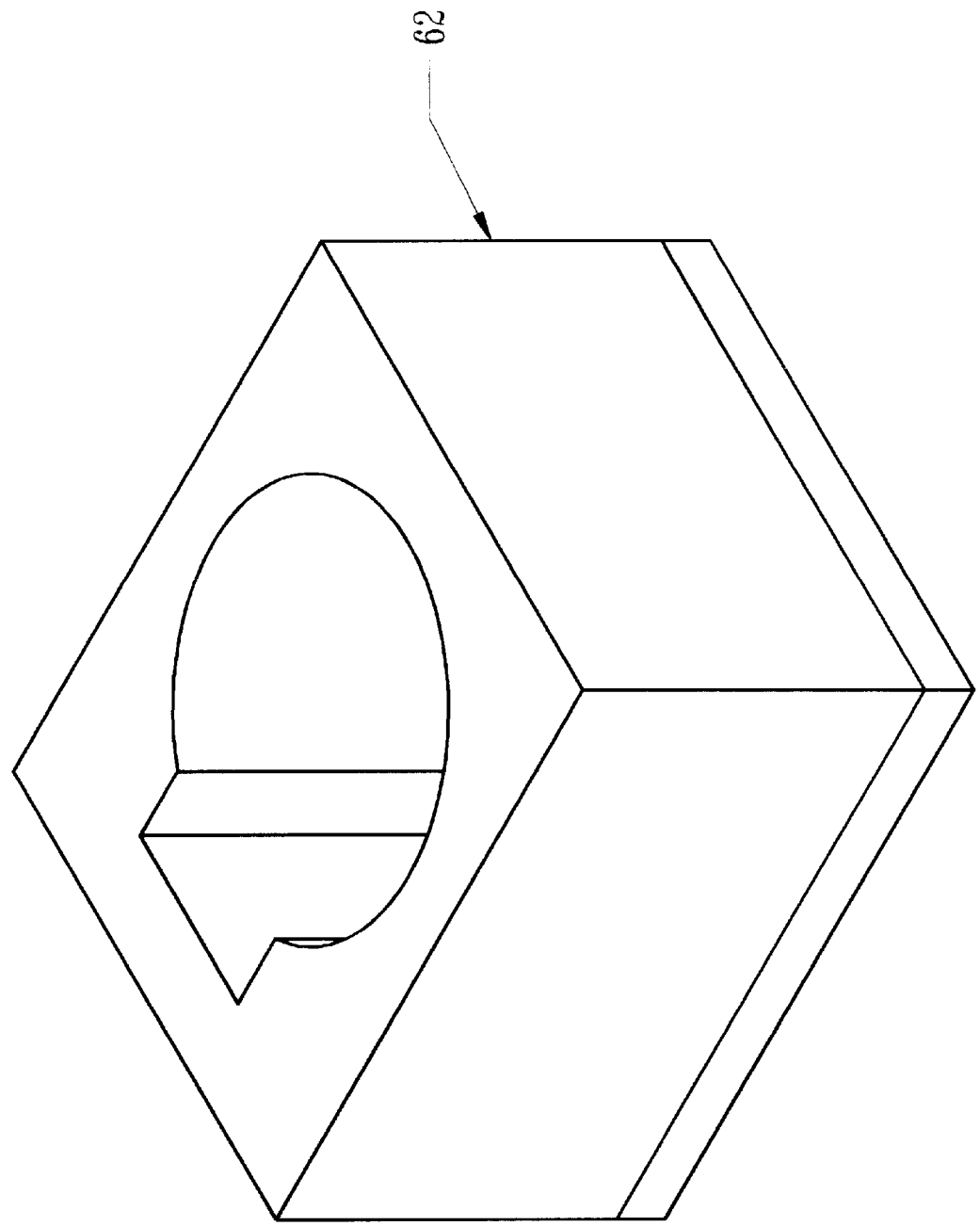

FIG. 10 is a perspective view of a module adapted for receiving a fishing reel. The shown module is preferably made of resilient synthetic foam.

Figure 11:
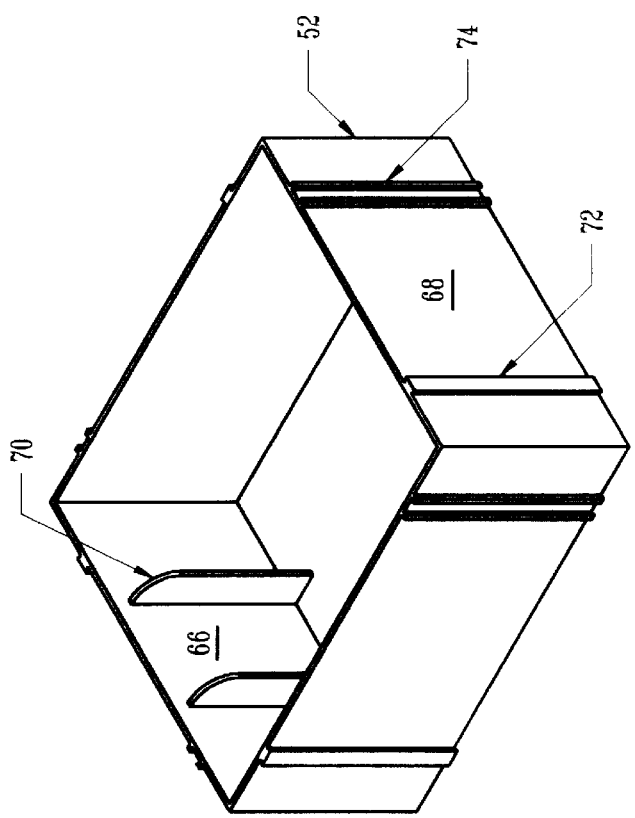

FIG. 11 is a perspective view of a module adapted for receiving three popular one and one-half inch thick fly boxes.

Figure 12:
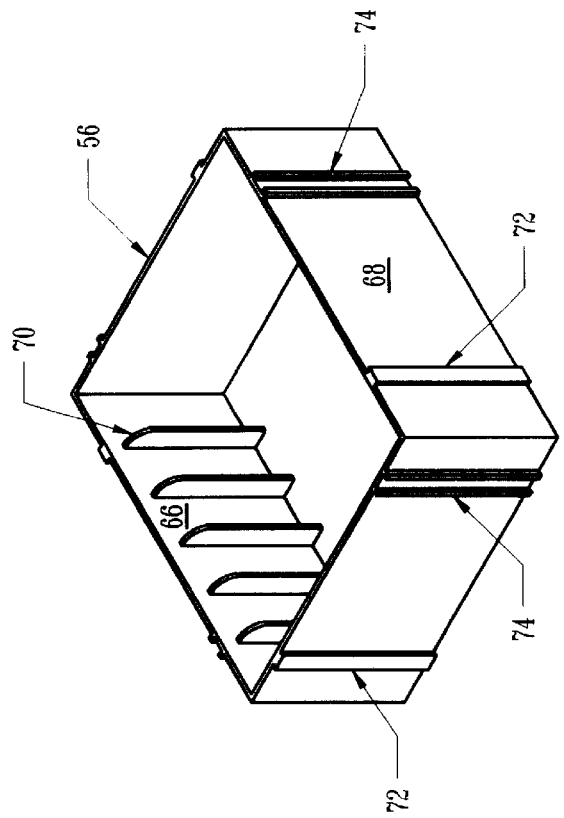

FIG. 12 is a perspective view of a module adapted for receiving six popular three quarter's of an inch thick fly boxes.

Figure 13:
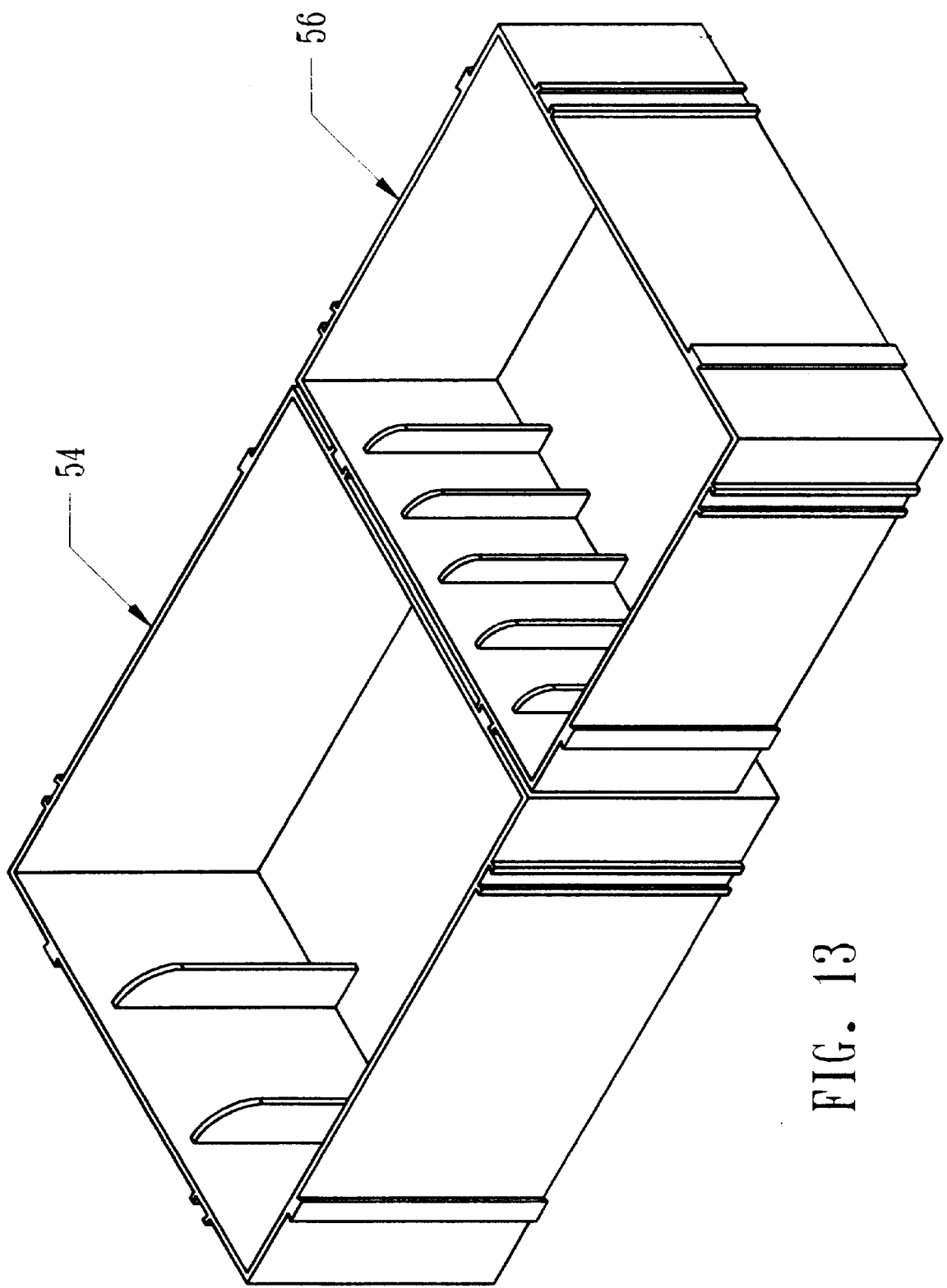

FIG. 13 is a perspective view of a module adapted for receiving three popular one and one-half inch thick fly boxes attached to a module adapted for receiving six popular three quarter's of an inch thick fly boxes, and illustrating the mating function of the male and female track sections.

Figure 14:
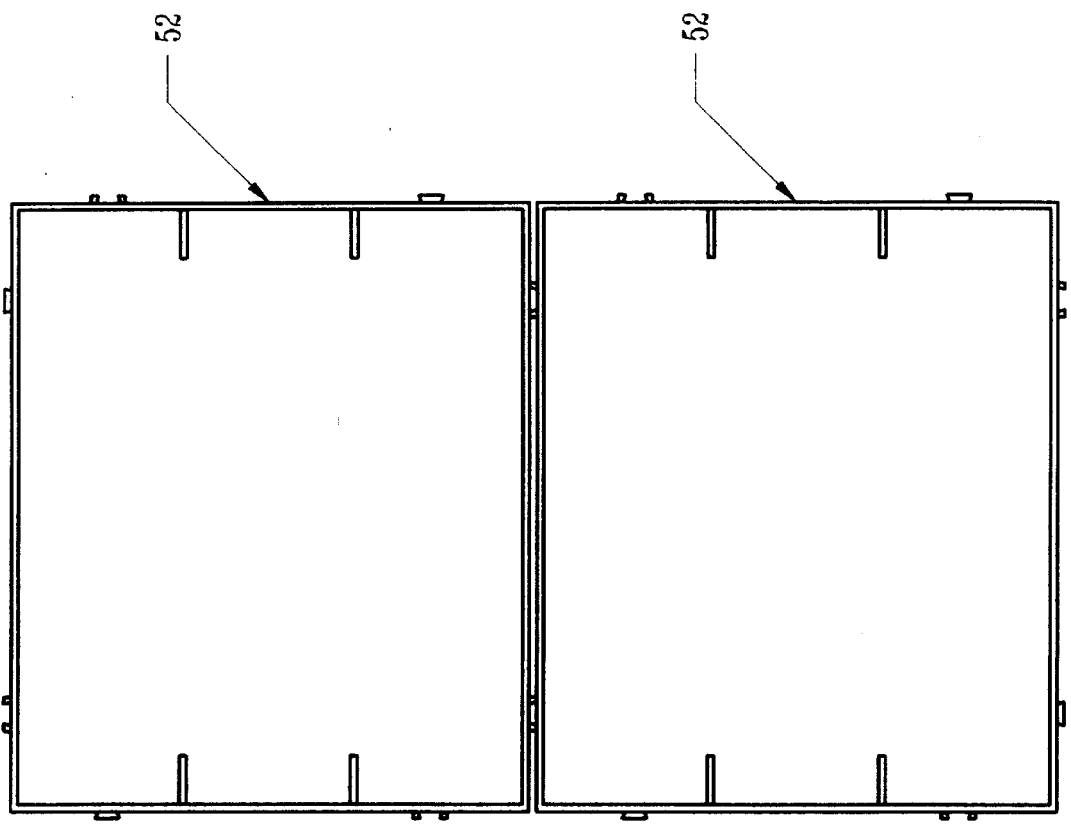

FIG. 14 is a plan view of two modules adapted for receiving three popular one and one-half inch thick fly boxes, each of the modules shown attached to one another, and illustrating the mating function of the male and female track sections.

Figure 15:
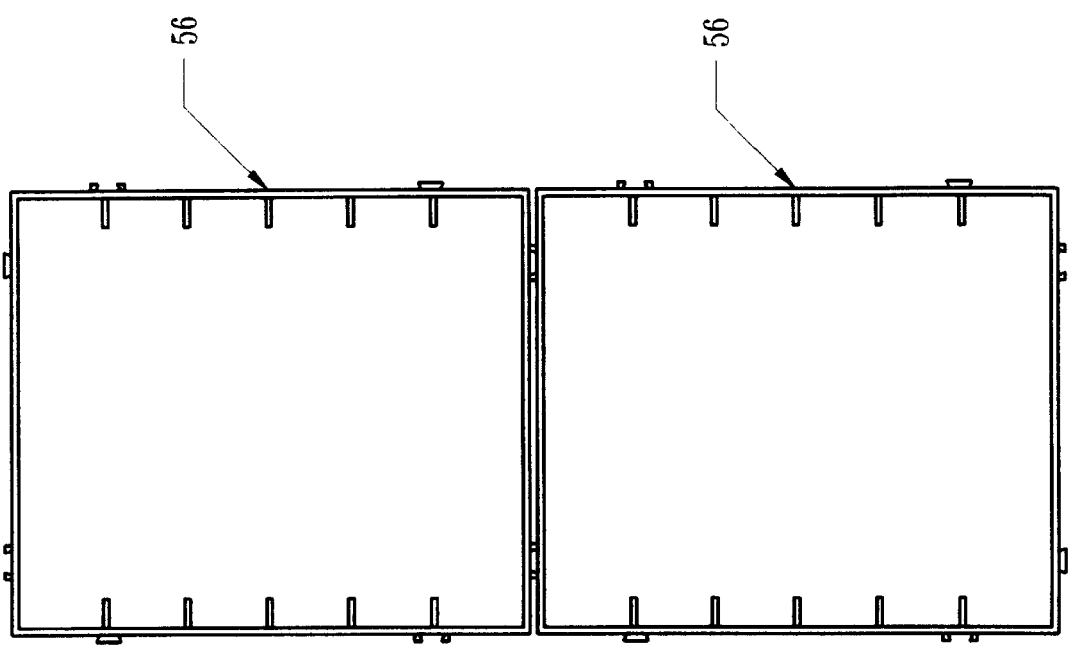

FIG. 15 is a plan view of two modules adapted for receiving six popular three quarter's of an inch thick fly boxes, the modules shown attached to one another, and illustrating the mating function of the male and female track sections.

Figure 16:
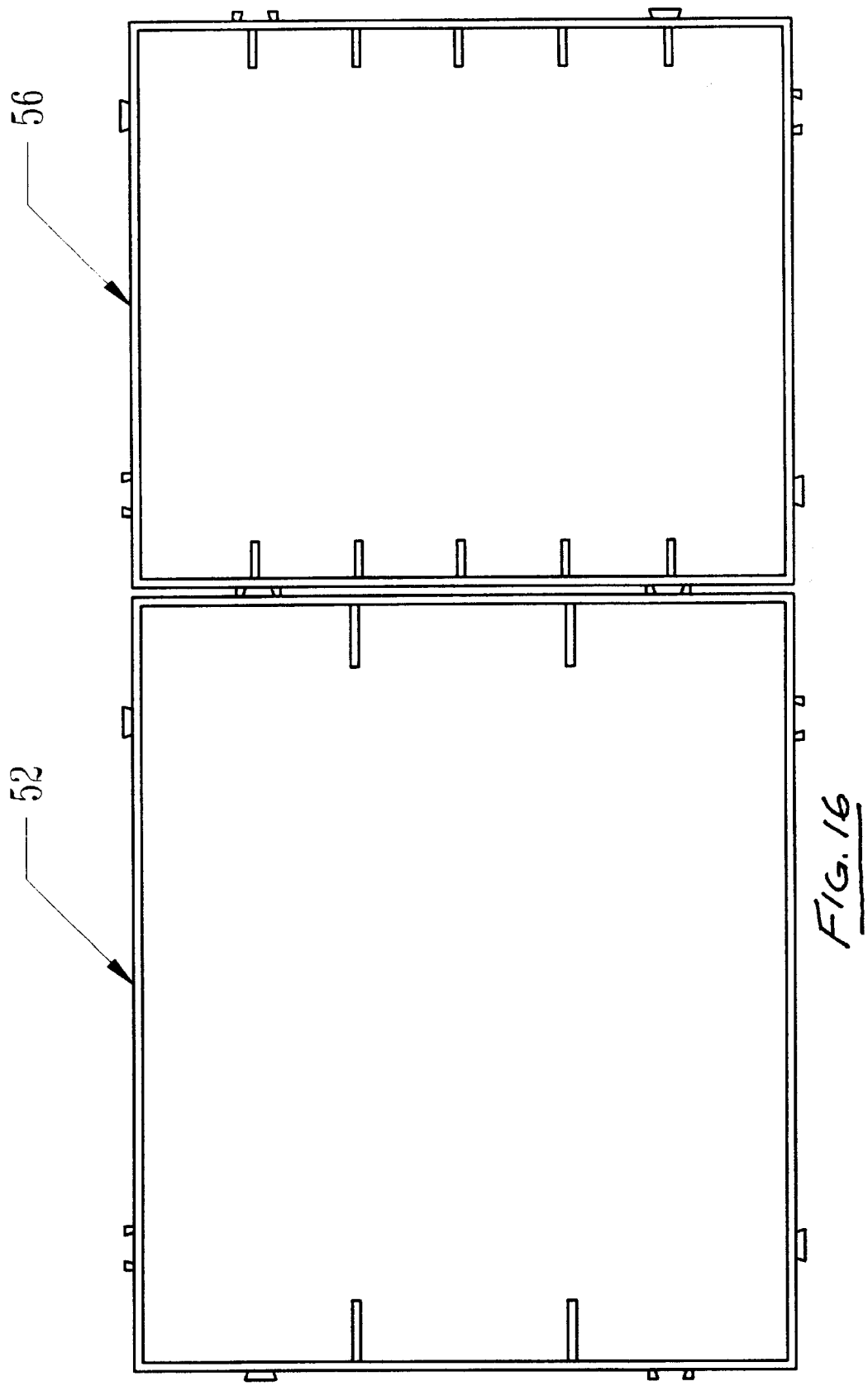

FIG. 16 is a plan view of a module adapted for receiving three popular one and one-half inch thick fly boxes attached to a module adapted for receiving six popular three quarter's of an inch thick fly boxes, and illustrating the mating function of the male and female track sections.

Figure 17:
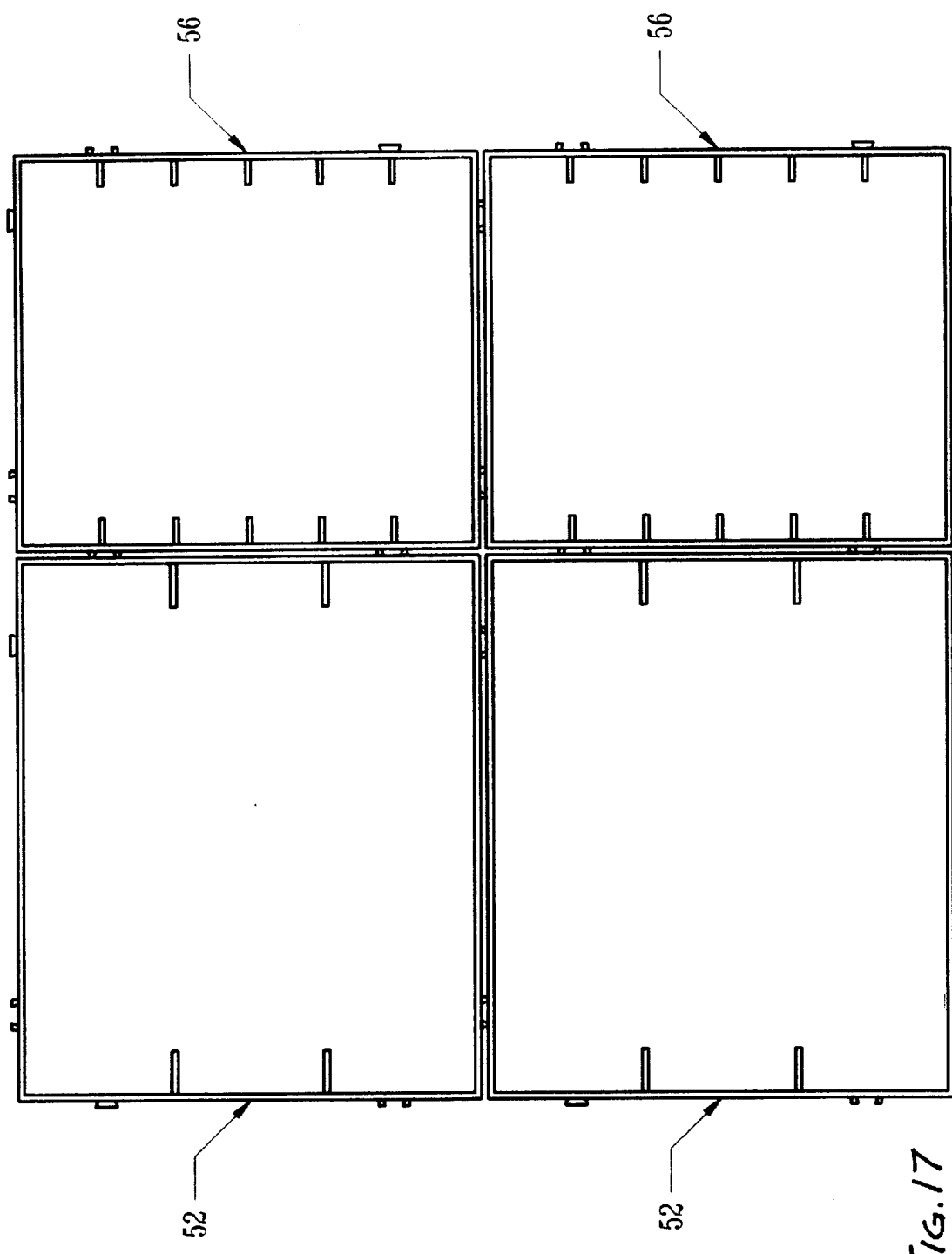

FIG. 17 is a plan view of four modules attached to one another, two modules being modules adapted for receiving three one and one-half inch thick fly boxes and two modules being modules adapted for receiving six three quarter's of an inch thick fly boxes, the figure also further illustrating the mating function of the male and female track sections.

Figure 18:
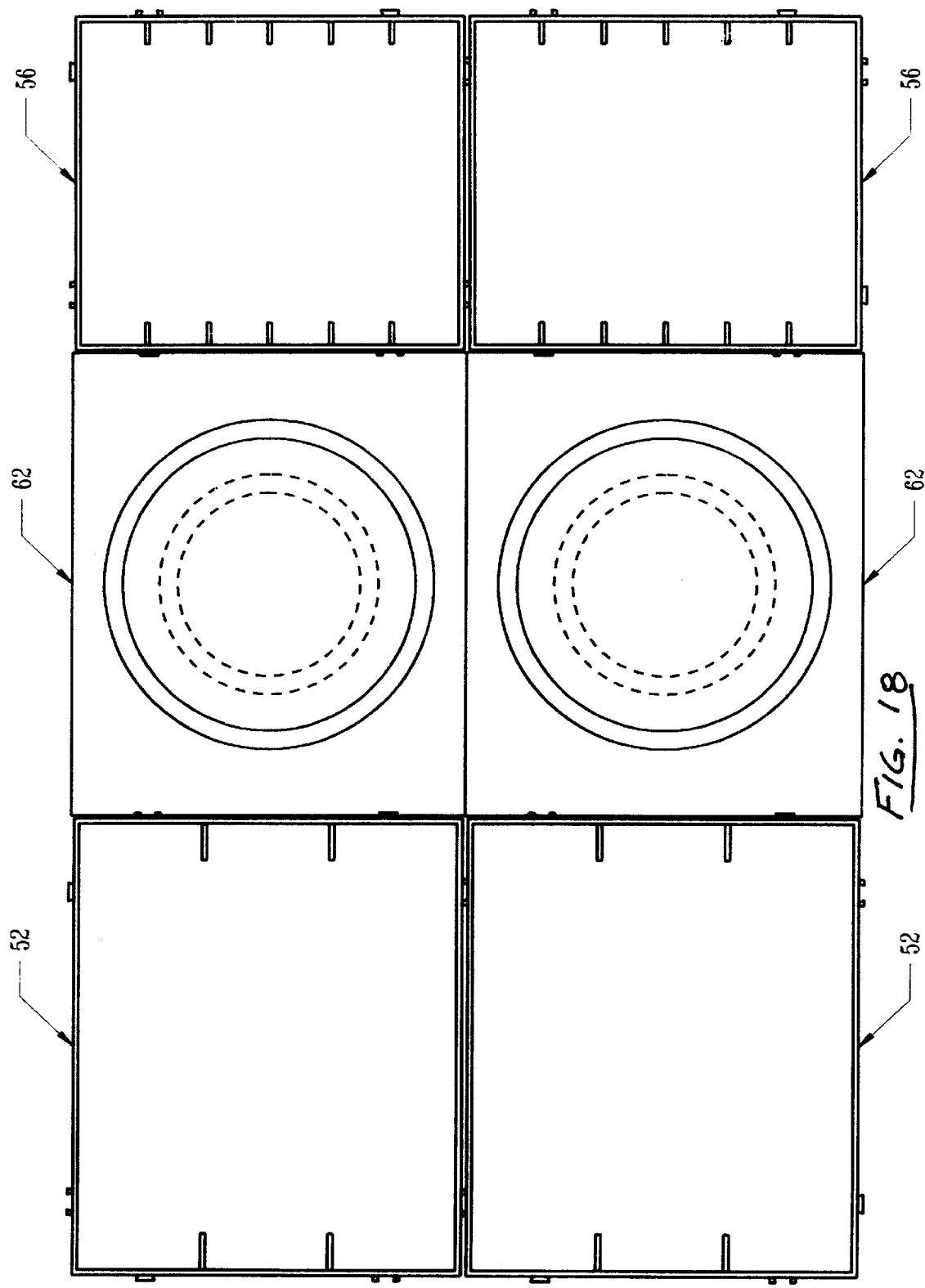

FIG. 18 illustrates a plan view of the modules shown in FIG. 1, the case of FIG. 1 is not shown in this figure.

Figure 19:
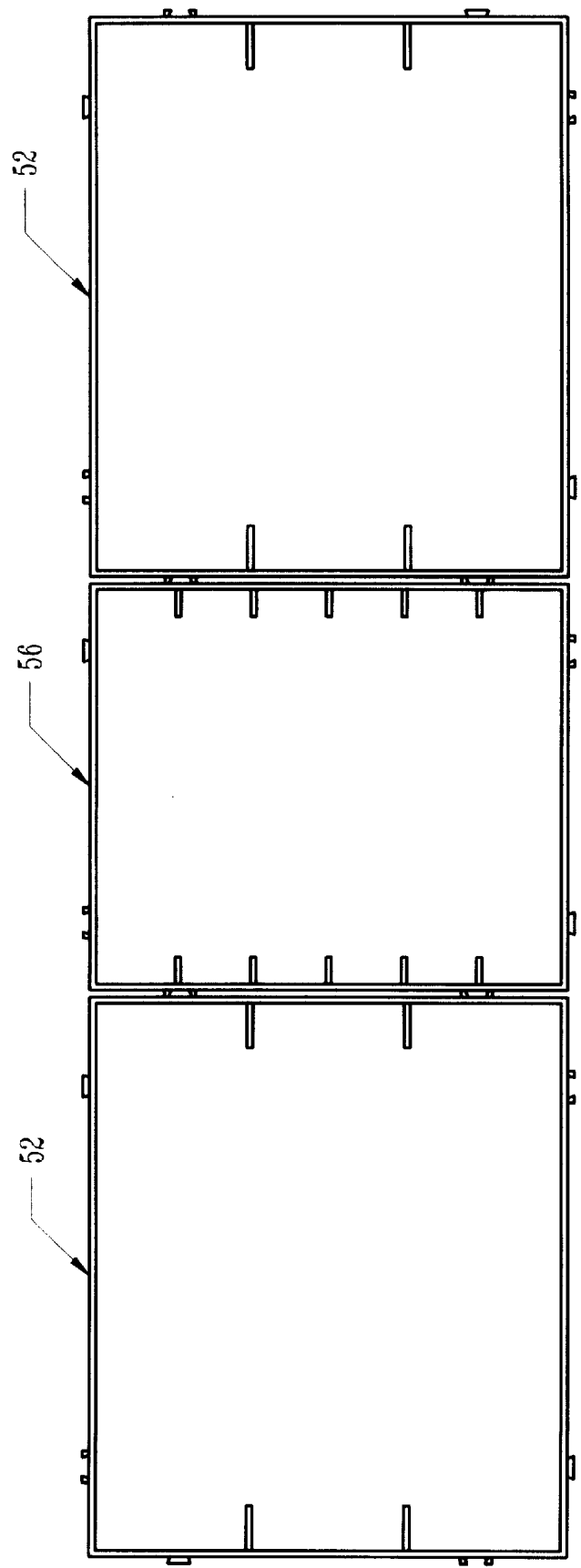

FIG. 19 is a plan view of another configuration of attached modules.

Figure 20:
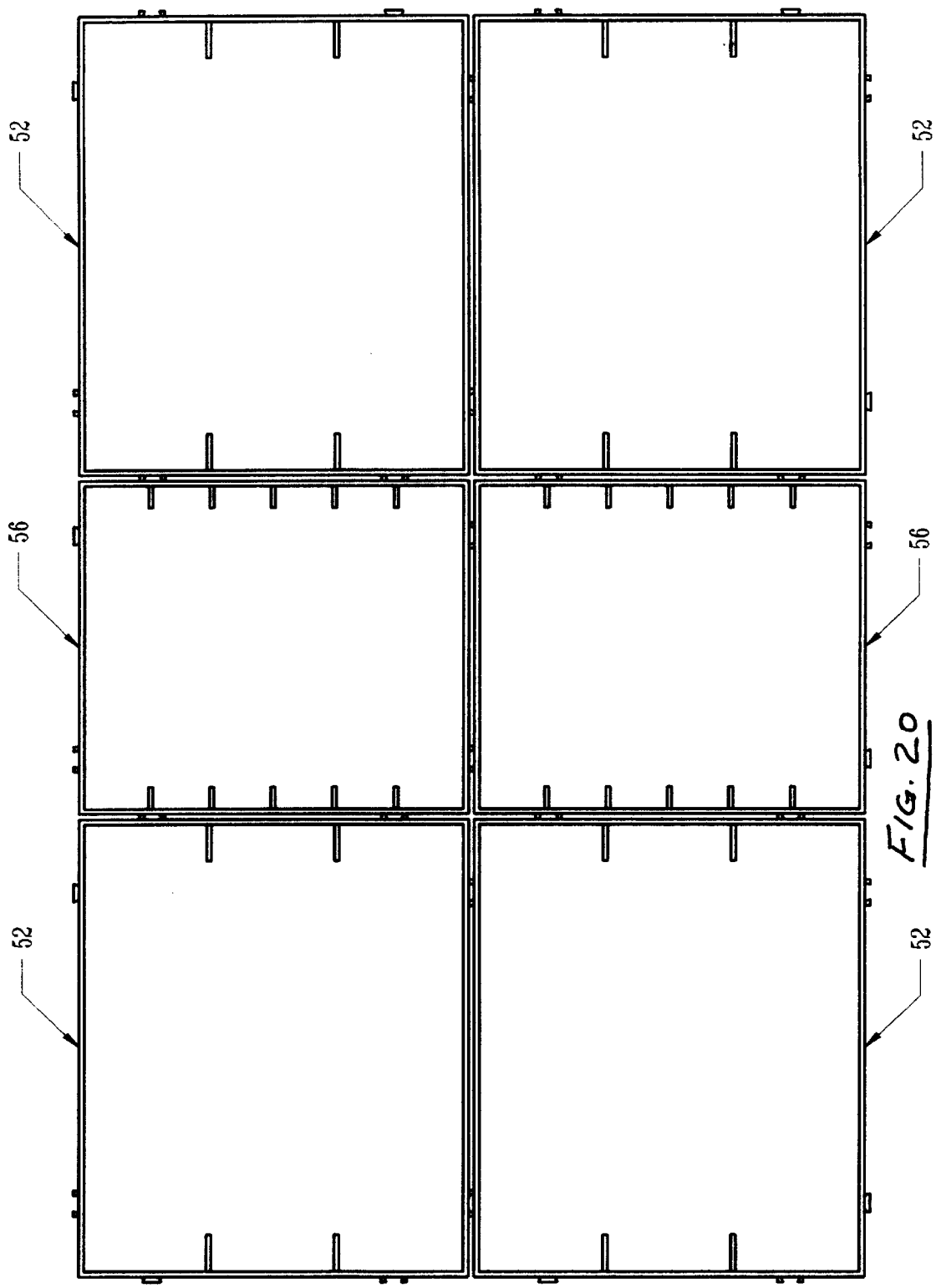

FIG. 20 is a plan view of another configuration of attached modules.

Figure 21:
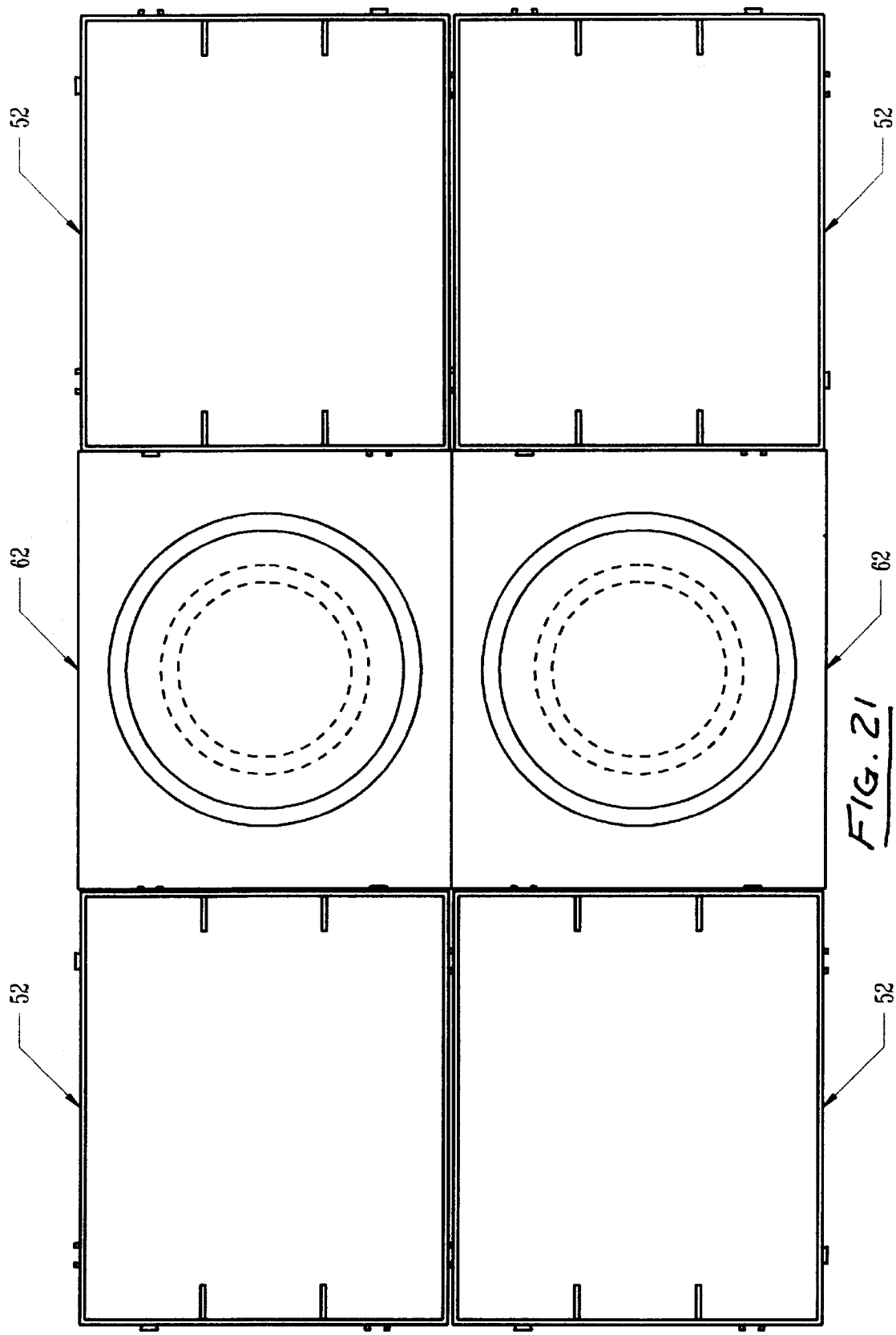

FIG. 21 is a plan view of another configuration of attached modules.

Figure 22:
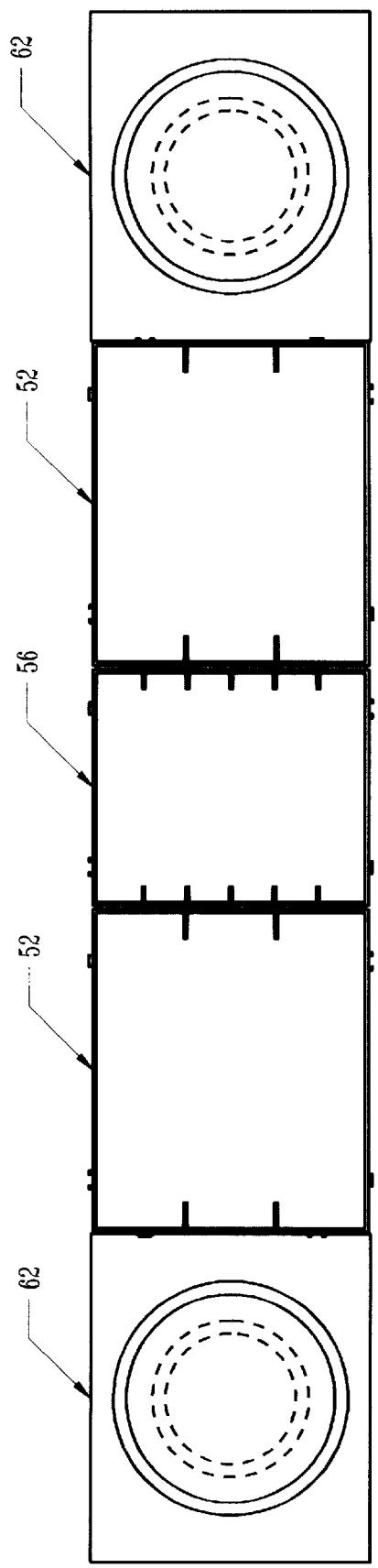

FIG. 22 is a plan view of another configuration of attached modules. Note that the longer configuration an be used with a case that has correspondingly larger proportions. In one embodiment of the invention it is contemplated that this larger configuration be used in order to allow for a case which can include a pocket for holding at least one fly rod of the type which collapses to approximately 32 inches in length.

Figure 23:
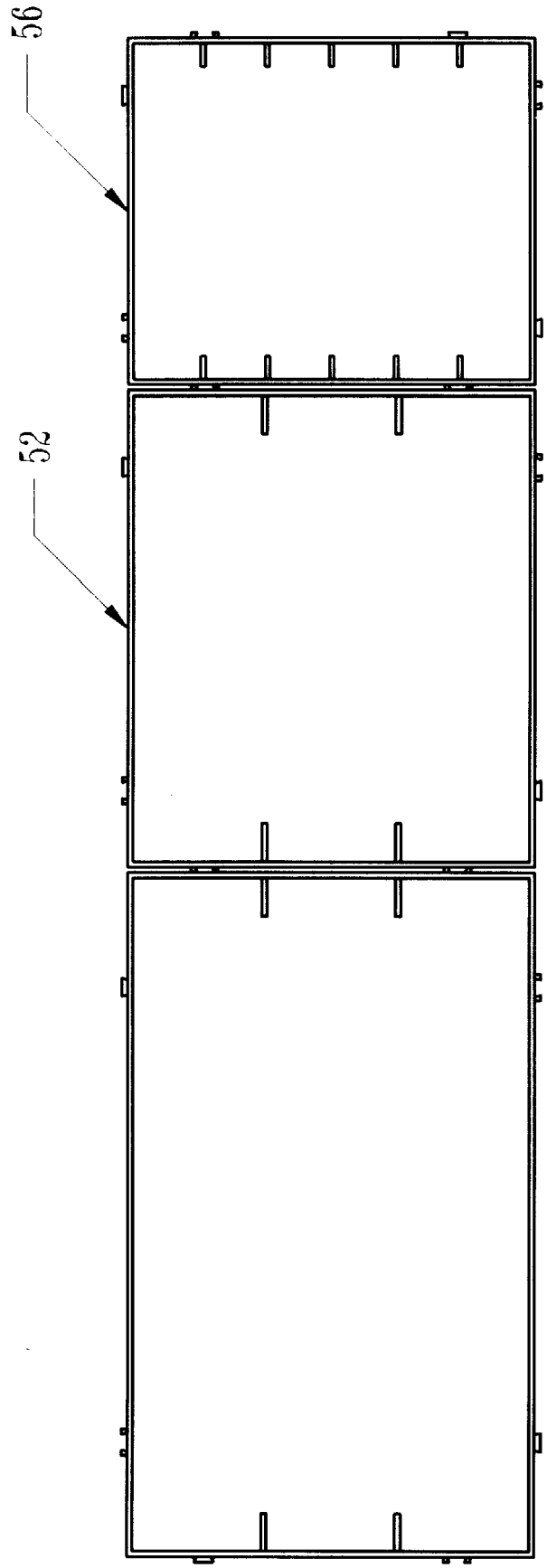

FIG. 23 is a plan view of yet another configuration of attached modules, with a module that may hold wallets or large, saltwater fly boxes.

Figure 24:
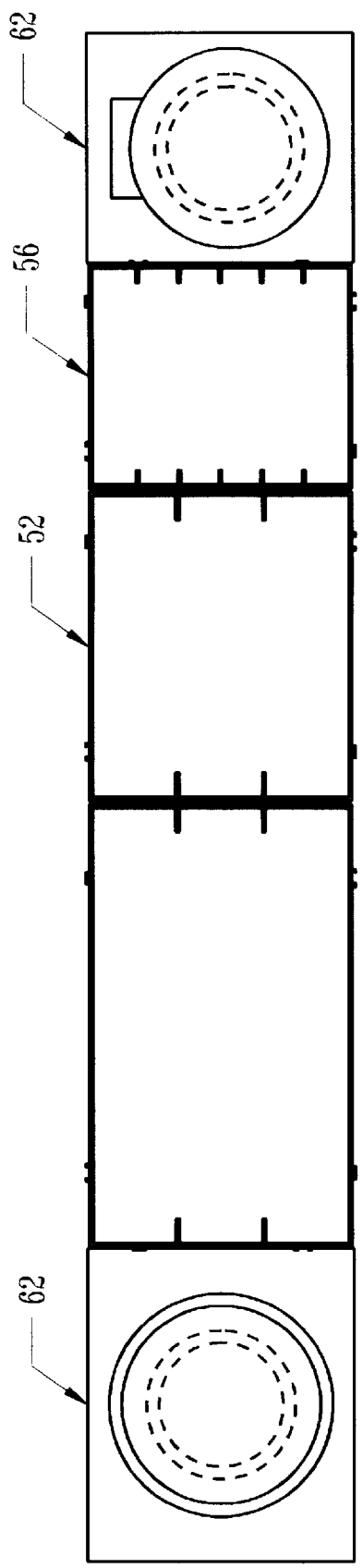

FIG. 24 is a plan view of another configuration of attached modules. This configuration also contemplates the use of a large case that has means, such as a pocket, for accommodating a fishing rod which collapses to 32 inches in length.

Figure 25:
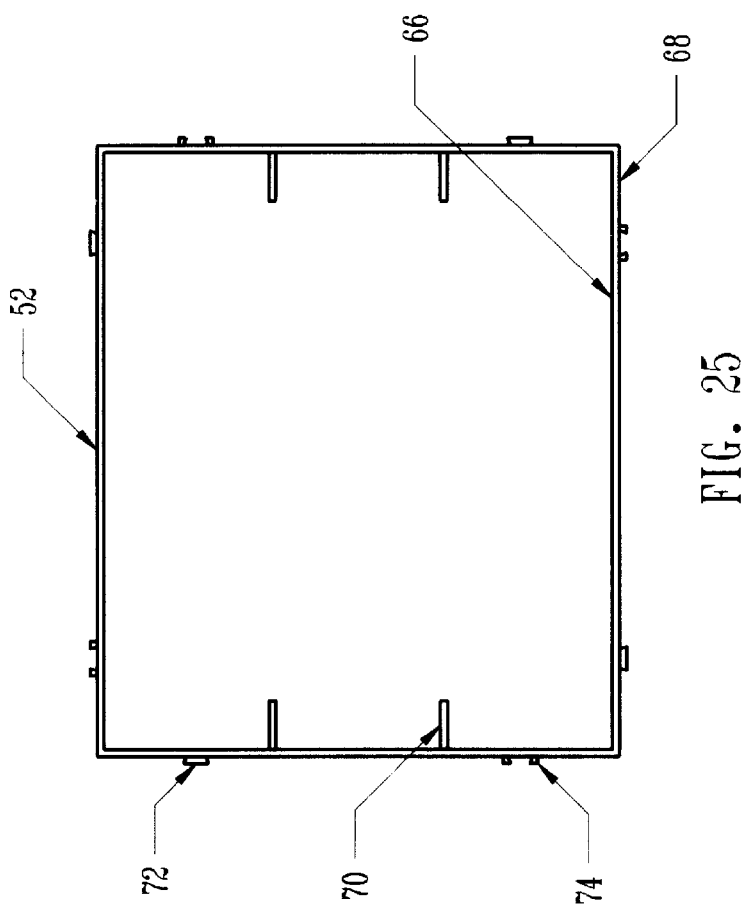

FIG. 25 is a one to one scale plan view of a module adapted for receiving three standard one and one-half inch thick fly boxes attached to a module adapted for receiving six standard three quarter's of an inch thick fly boxes and illustrating the male and female track sections.

Figure 26:
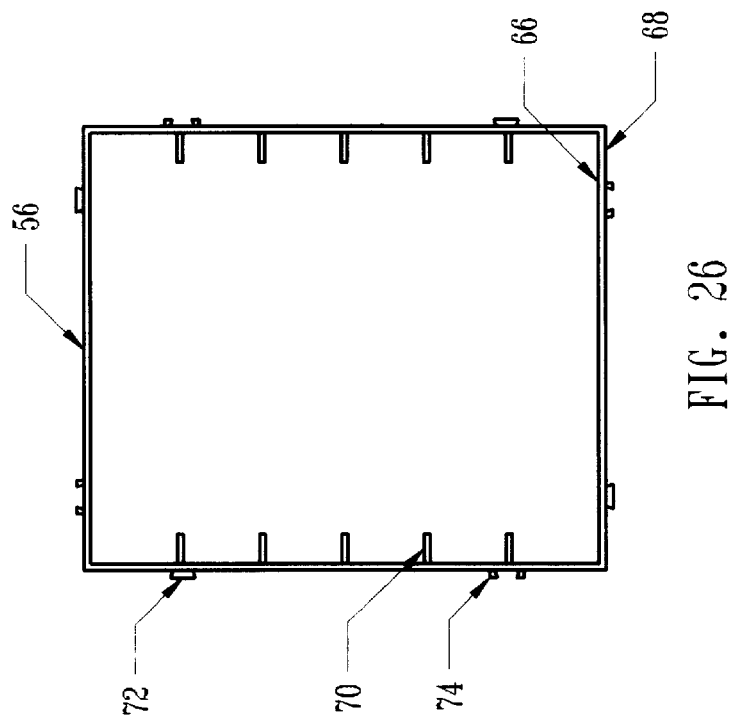

FIG. 26 is a one to one scale plan view of a module adapted for receiving six standard three quarter's of an inch thick fly boxes, the figure also further illustrates the male and female track sections.

Figure 27:
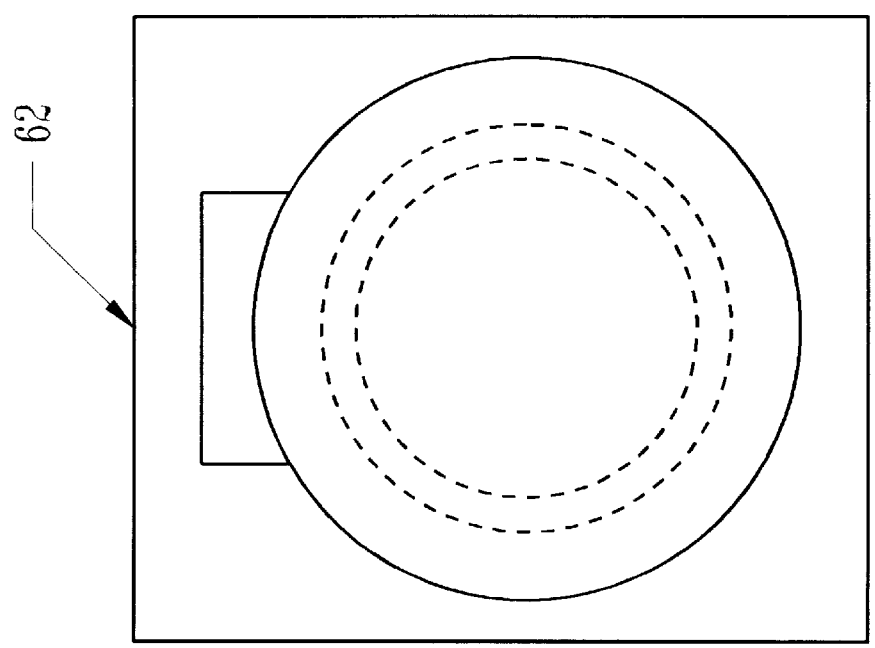

FIG. 27 is a one to one scale plan view of a module adapted for receiving a fly fishing reel and a spare spool, the module is preferably made of synthetic foam block.

Figure 28:
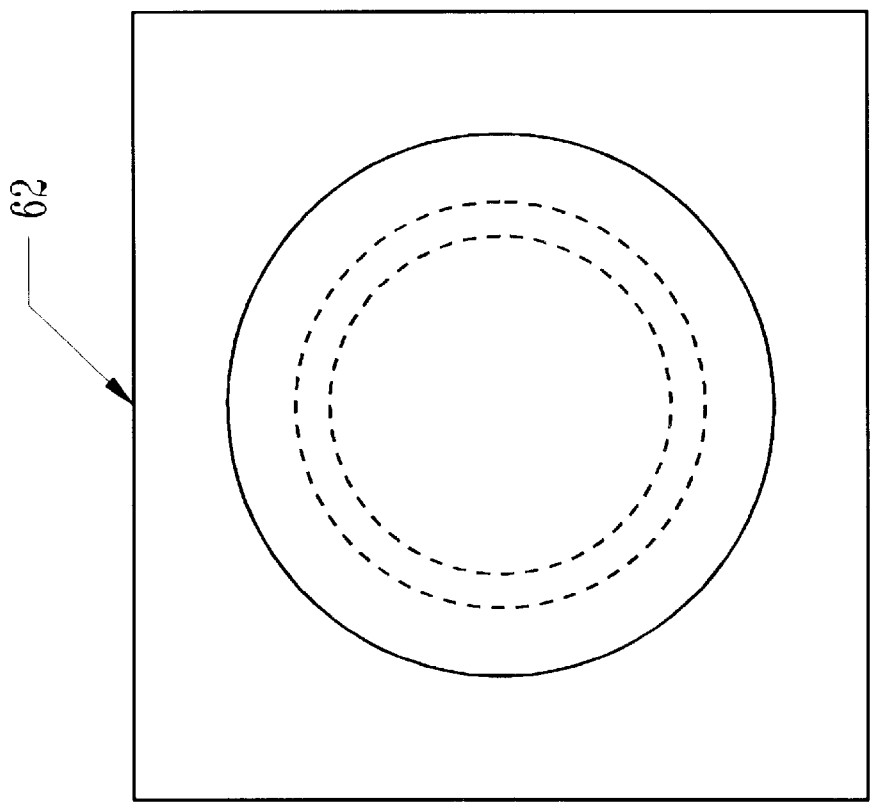

FIG. 28 is a one to one scale plan view of another embodiment of a module adapted for receiving a fishing reel.

Figure 29:
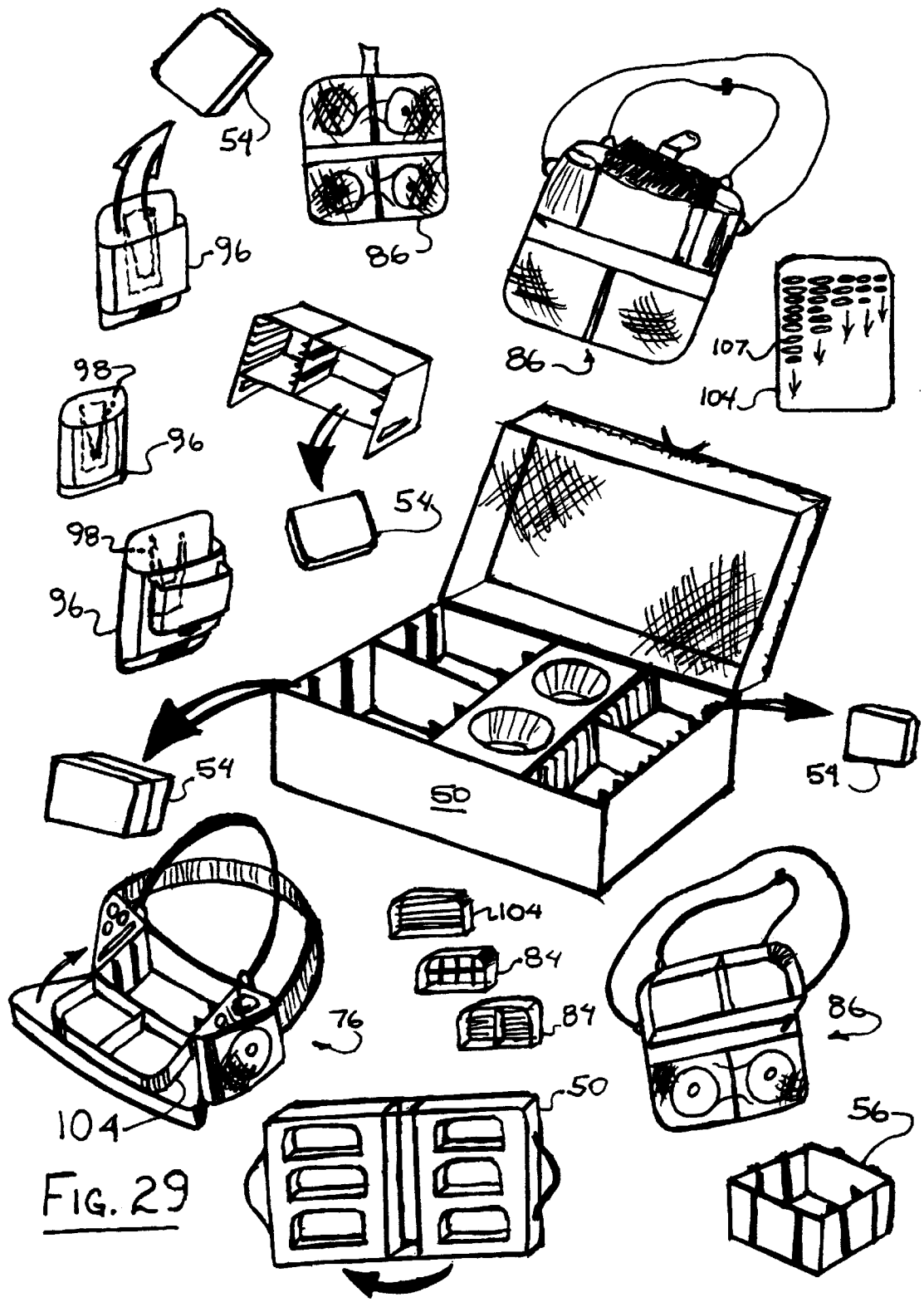

FIG. 29 is diagram showing various components of the system of the instant invention and showing how each element can be interchanged with other components to customize the carrying capacity of the case and the use of the fly boxes and modules with various components, such as the waist pack, the holsters which clip on to the user's belt, the wallets, and the interchangeable plates. The drawing also show a fly plate notebook which holds several interchangeable plates as well as several fly trays. The interchangeable plates or fly trays attach to the inside of the notebook in a manner similar to the attachment of the interchangeable plates or fly trays to the inside of the wallets.

Figure 30:
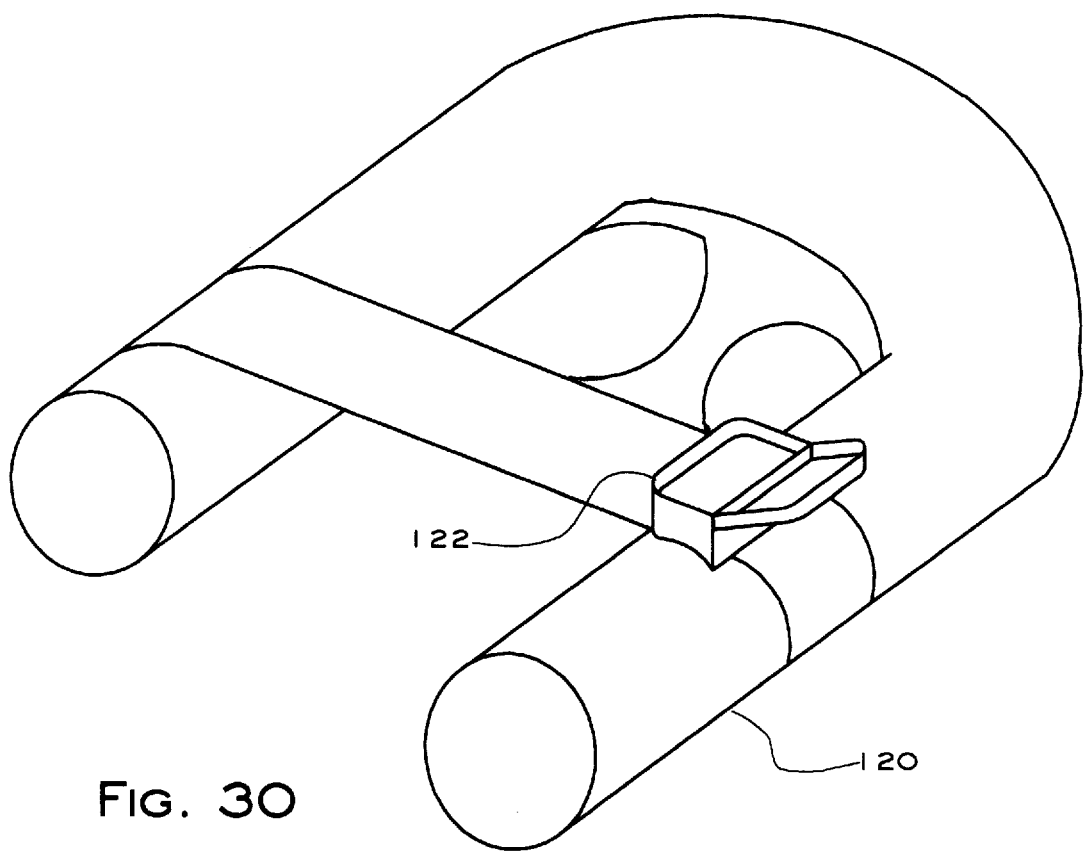

FIG. 30 illustrates the use of a case mounted over a case support that fits over a float tube, a pontoon, or similar flotation device. The case and trays can thus be selected and opened set in the lid of the case support.

Figure 31:
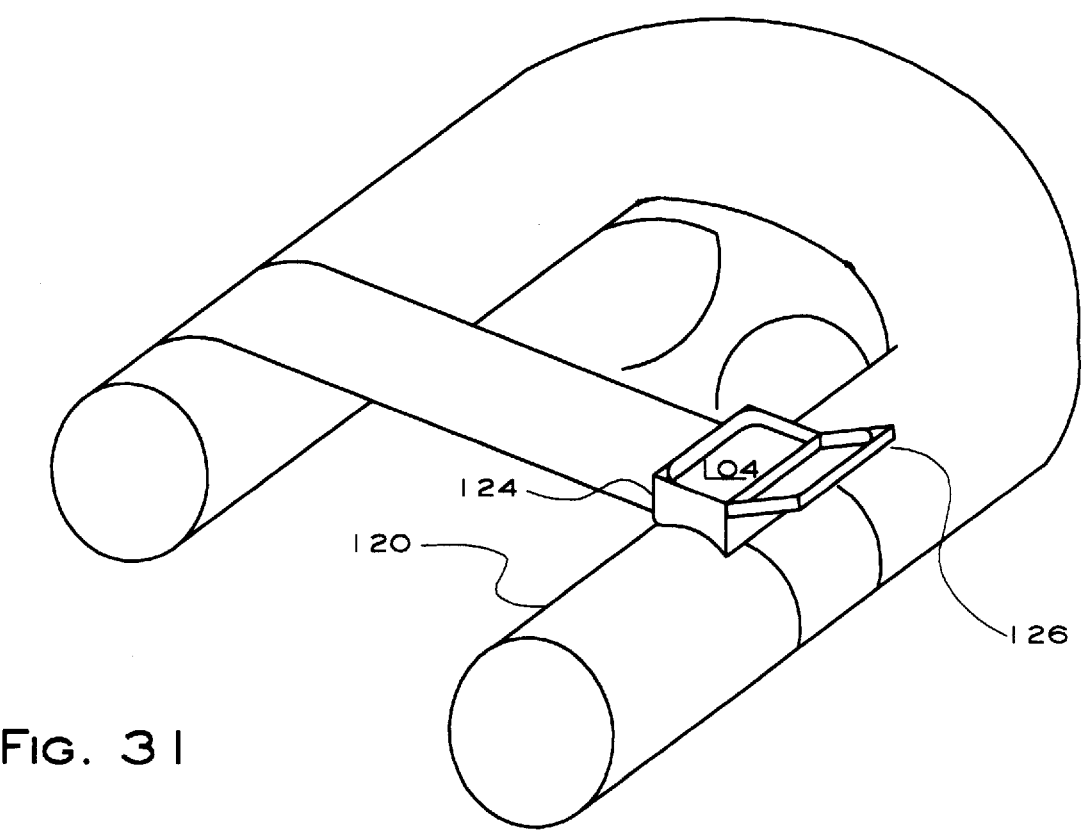

FIG. 31 illustrates the use of the system with a pocket on the float tube. The pocket being adapted for receiving components of the system taught herein.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIG. 1 where a perspective view of a case 50 two of a large fly box modules 52, each large fly box module 52 holding three large fly boxes 54, each fly box being one and one-half inches thick. The case is also shown holding two small fly box modules 56, each small fly box module 56 holding six fly boxes 58 or, as will be referred to later herein, containers for flies. It is contemplated that each small fly box 56 which in a standard size small fly box measure three quarters of an inch in thickness. Thickness being measured along dimension 60 as shown on FIG. 2. Also shown in FIG. 1 are two reel modules 62 that have been adapted for holding a fly fishing reel and a spare spool for a fly fishing reel.

Figure 2:
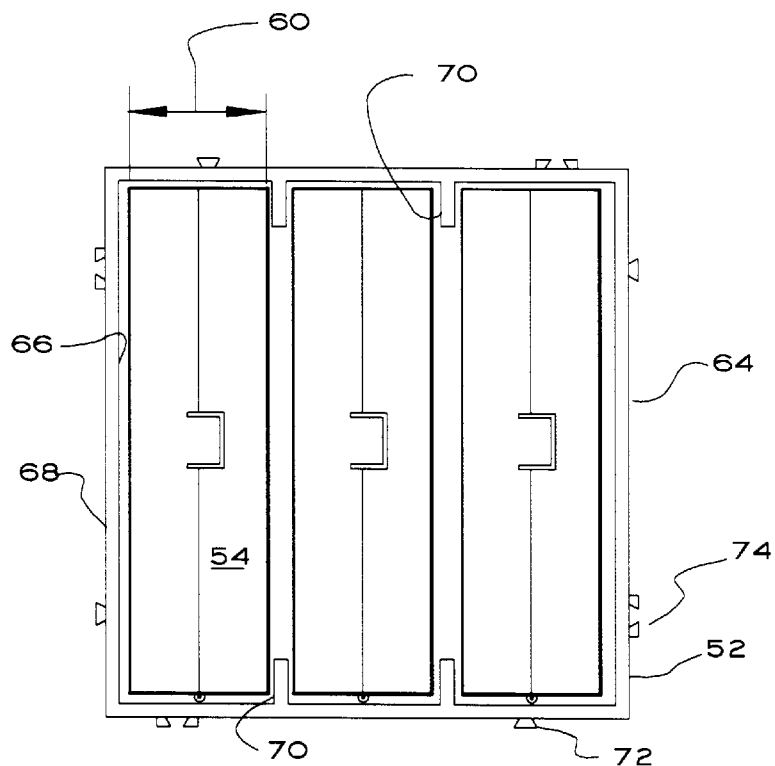
FIG. 2 is a plan view of three of the one and one-half inch thick fly boxes in a module.
Figure 3:
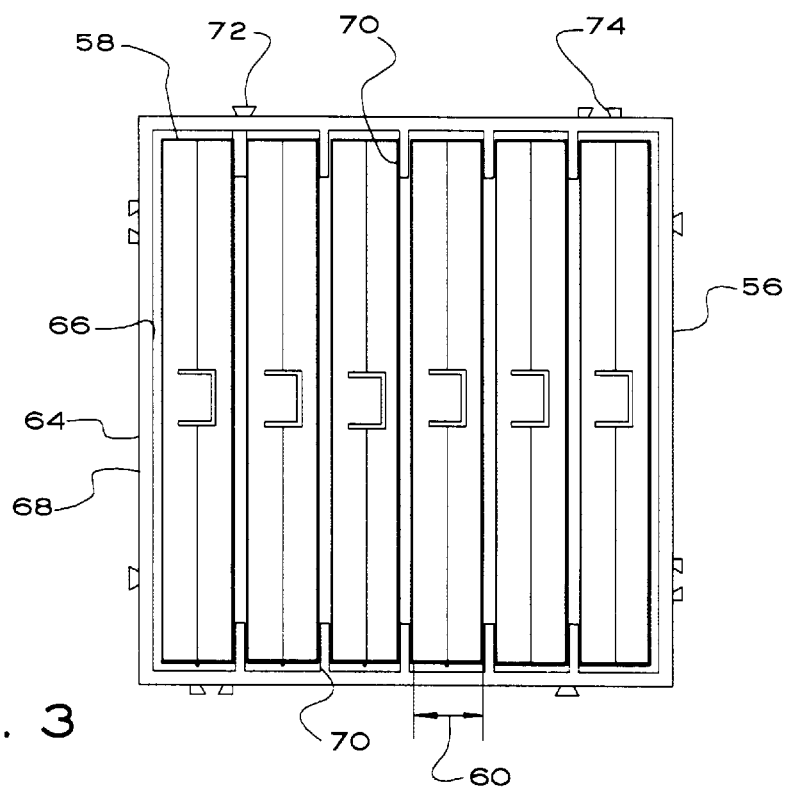
FIG. 3 is a plan view of six of the three quarters of an inch thick fly boxes in a module.

Turning now to FIG. 2 where a perspective view of three of the large fly boxes 54, showing the thickness feature which is one and one-half inch thick in standard large fly boxes. Similarly, on FIG. 3 is shown that the three quarter's of an inch thickness of the standard small fly box 58 is measured along a corresponding thickness feature 60 on the small fly box 58.

Turning now to FIG. 11 where it is shown that the large fly box module includes walls 64. The walls 64 include an internal surface 66 and an external surface 68. On the internal surface 66 are mounted several fins 70, which in this instance have been spaced apart in order to allow acceptance of the large fly boxes 54. The placement of the fins 70 is dictated by the type of fly box or wallet to be carried in the module. On the external surface 68 of the walls 64 are several means for interlocking the modules. In a preferred embodiment, these means for interlocking the modules include mating male track 72 and female track 74 sections on the external surface 68 of walls 64 of the modules. It is important to note, however, that while mating tracks are used in a preferred embodiment, it is also contemplated that a variety of other means for interlocking the modules may be used. For example it is contemplated that mating hook and loop material may be used, or other mating mechanical components may be used, as well as reusable chemical adhesive means.

Similarly, in FIG. 12 a perspective view of the small fly box module 56 has been shown. The small fly box module 56 also includes walls 64. The walls 64 also including an internal surface 66 and an external surface 68. On the internal surface 66 are mounted several fins 70, which have been spaced apart in order to allow acceptance of the small fly boxes 58. As stated earlier, the placement of the fins 70 is dictated by the type of fly box or wallet to be carried in the module. Also on the external surface 68 of the walls 64 are several female tracks 74 as well as male tracks 72. As will be discussed in further detail below, these interlocking means may be used to interlock modules adapted for receiving small fly boxes to one another, as well as modules adapted for receiving small fly boxes to modules adapted to receiving large fly boxes, and modules adapted for receiving large fly boxes to one another.

Figure 4:
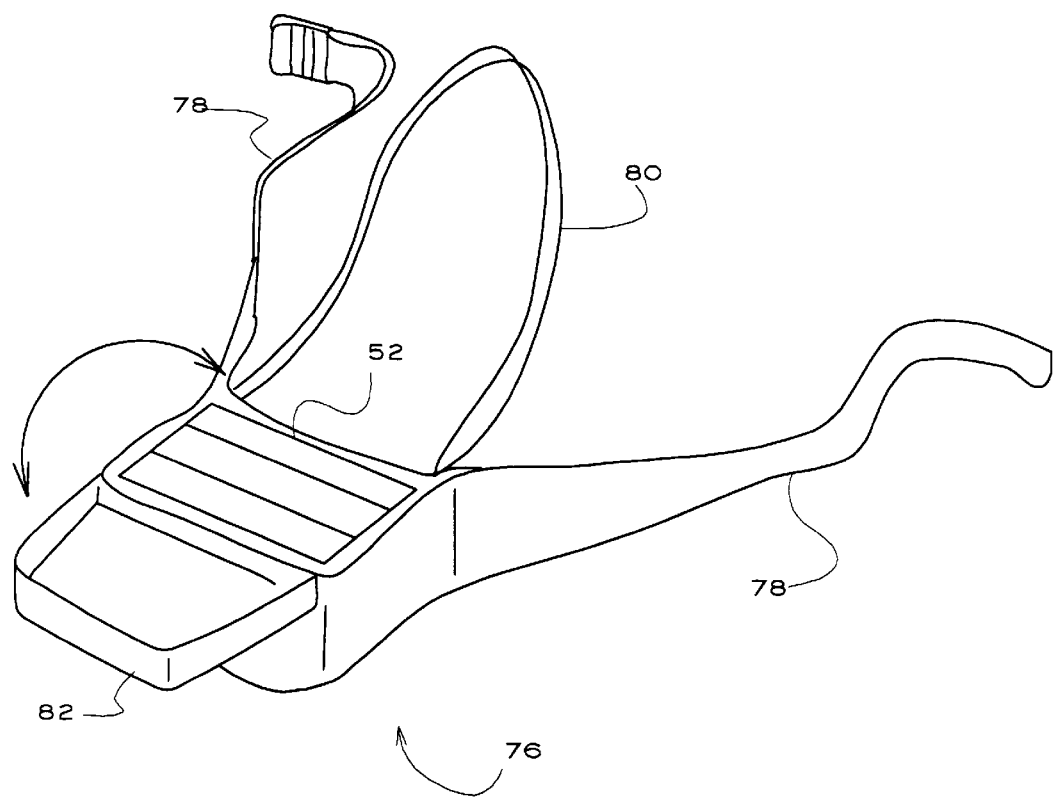
FIG. 4 is a perspective view of the waist pack with the lid type cover in an open position, showing a module in the waist pack, an interchangeable tray in the lid-type cover and the work surface formed by the cover.

Referring now to FIG. 4 where a perspective view of a waist pack 76 which has been adapted for receiving at least one module is shown. The waist pack 76 includes a waist strap 78 which is adapted for attaching the waist pack 76 about the user's waist. Also shown with the waist pack is a waist pack neck strap 80. The neck strap 80 allows the user to hold the waist pack 76 over the user's chest area and use the waist strap to firmly hold the waist pack 76 against the user's chest. It has also been shown on FIG. 4 that the waist pack 76 also includes a flip away type cover 82. The cover 82 is designed to open the top portion of the waist pack in a manner that provides access to the inside of the waist pack from above. This configuration allows easy transfer of a desired module from the case 50 and into the waist pack 76. Also it is important to note that the cover 82 should incorporate stops or allow for a maximum rotational travel of 180 degrees, so that the cover 82 may also serve as a small work surface for the user when opened.

Figure 5:
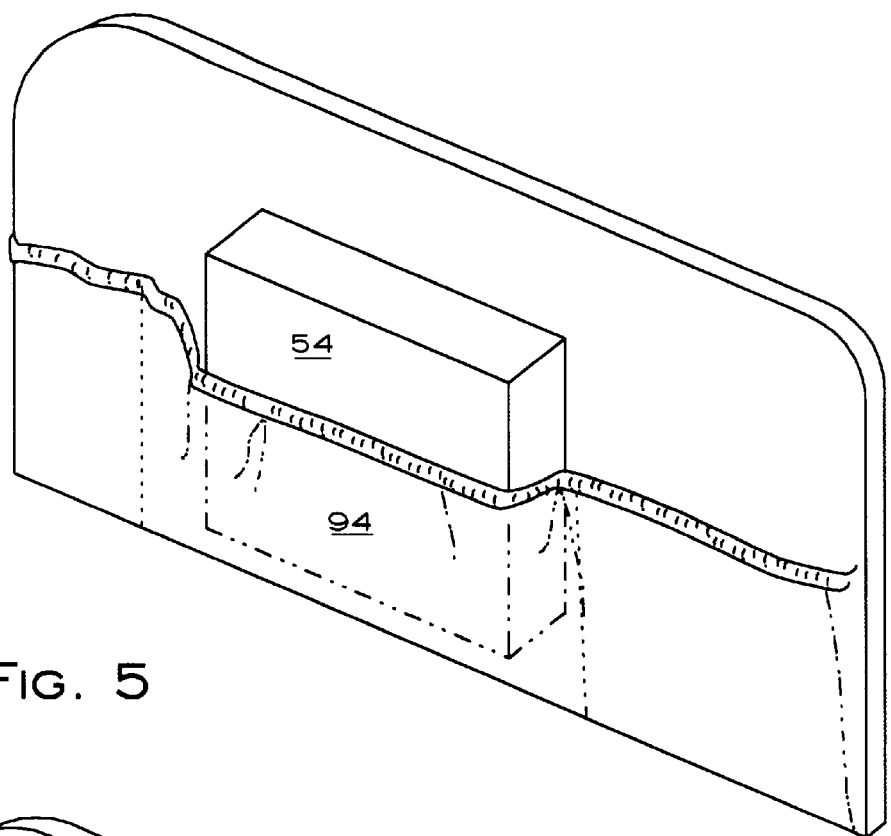
FIG. 5 is a perspective view of a configuration of the interchangeable plates, the embodiment shown having one pocket for a fly box.
Figure 6:
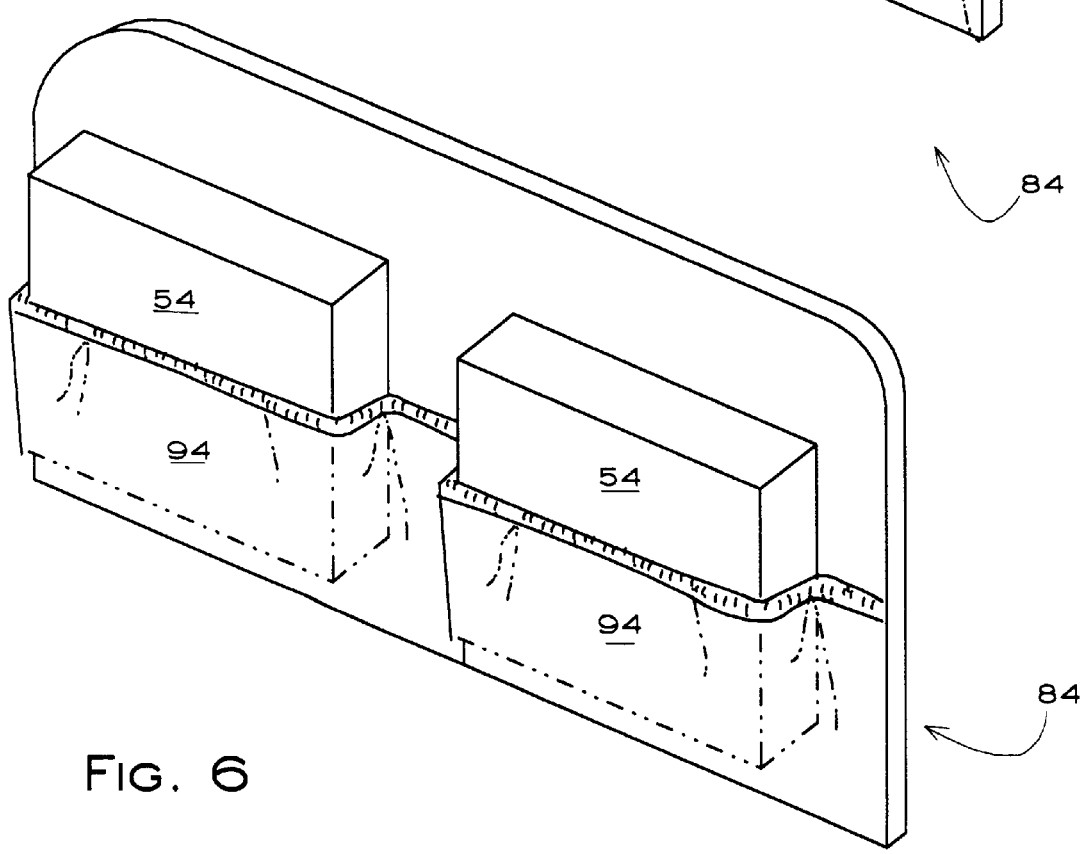
FIG. 6 is a perspective view of another configuration of the interchangeable plates, the embodiment shown having two pockets, each designed for holding a fly box.

Turning now to FIGS. 5, 6, 8, 8A, 8B, 9 and 9A where it is shown that an important element of the instant invention is the incorporating of interchangeable plates 84. Shown in FIG. 9A is a wallet 86 used with the instant invention. The wallet 86 is shown with attachments 88 used incorporating a neck strap as well as a chest strap to hold the wallet against the user's chest. FIG. 9A also shows the outline of the footprint 89 of the interchangeable plates 84 and the preferred location of hook and loop strips 92 for attaching the interchangeable plates to the wallet. In FIGS. 5 and 6 are shown configurations of the interchangeable plates 84, the embodiment shown on FIG. 5 including one pocket 94 for a fly box, such as a small fly box 58 or a large fly box 54.

Figure 8:
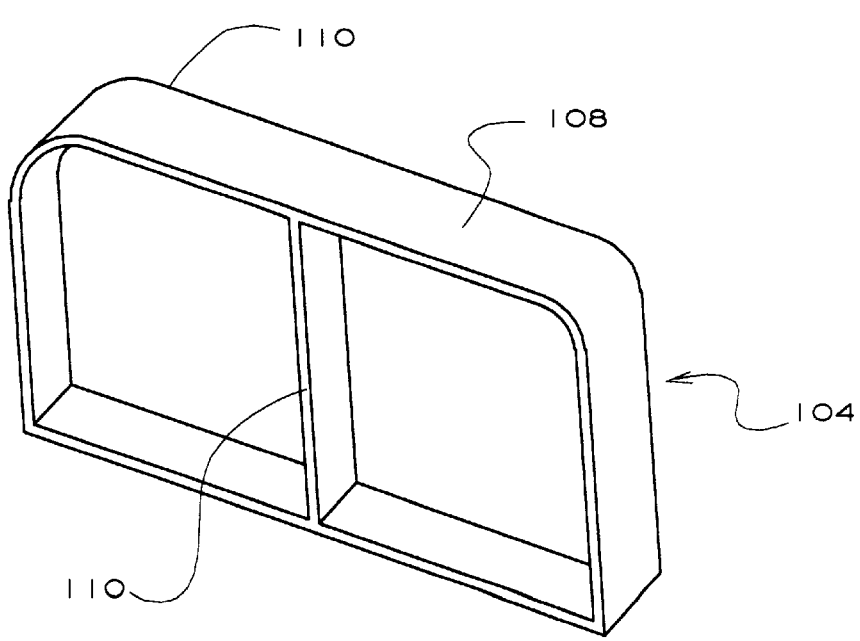
FIG. 8 is a perspective view of an embodiment of a fly tray used with the instant invention.
Figure 8A:
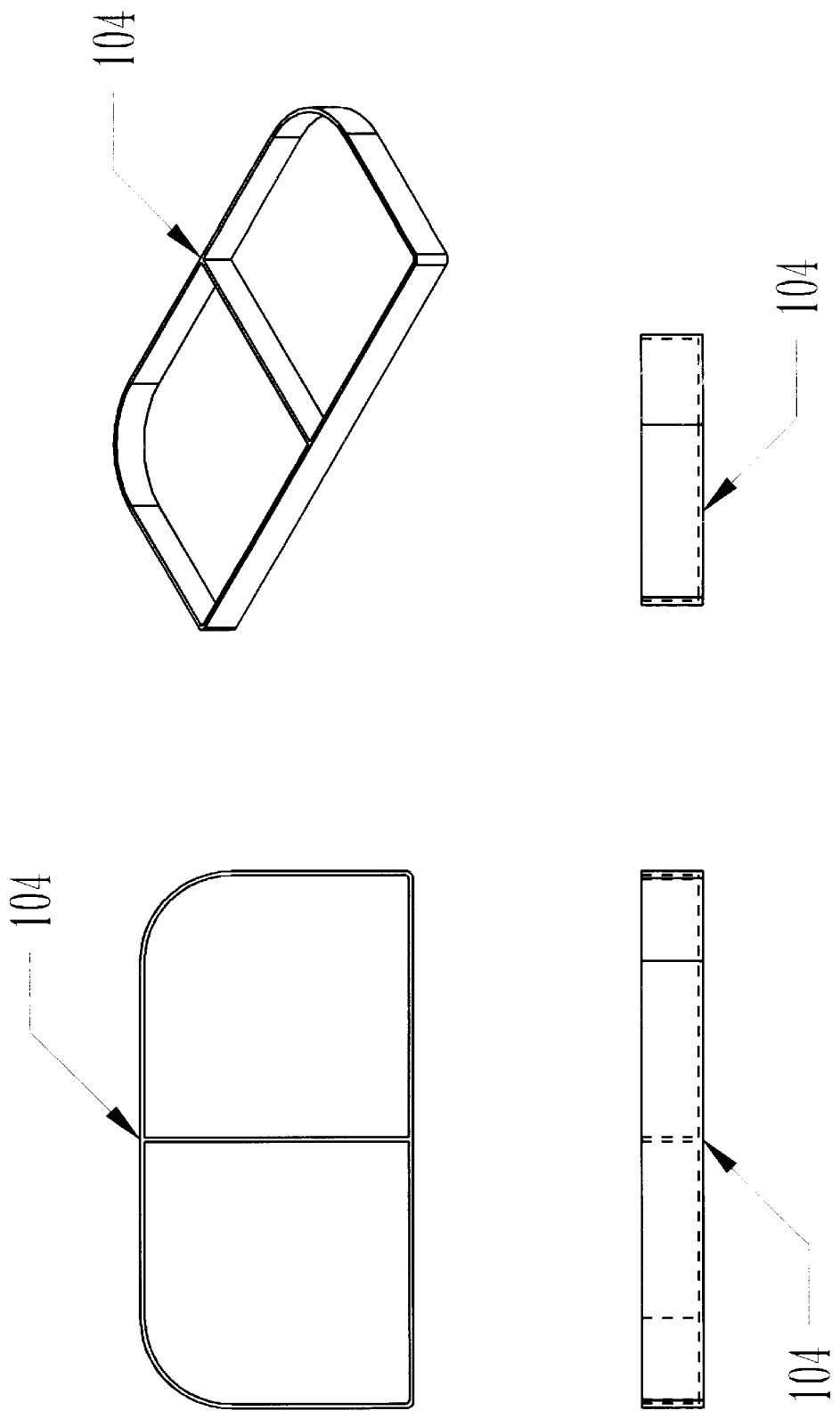
FIG. 8A is a production type drawing of an embodiment of a fly tray used with the instant invention. The fly tray including a central dividing wall or rib separating the tray into half sections.
Figure 8B:
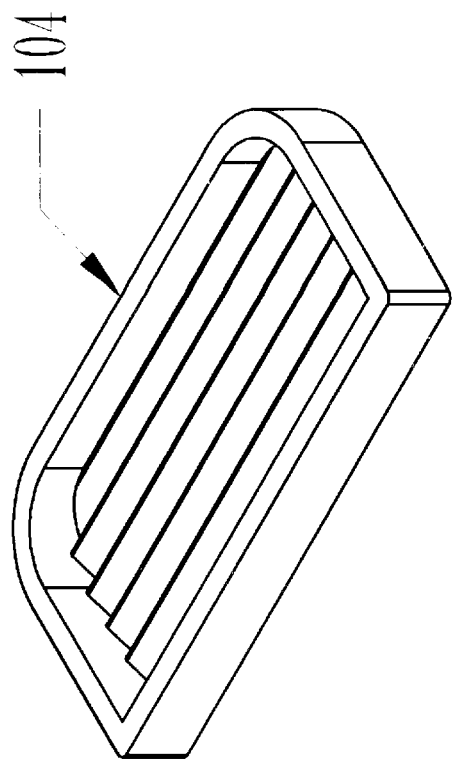
FIG. 8B is a production type drawing of a foam insert that may be used with a fly tray or by itself as a fly tray. The insert is preferably made of rippled foam.
Figure 8B:
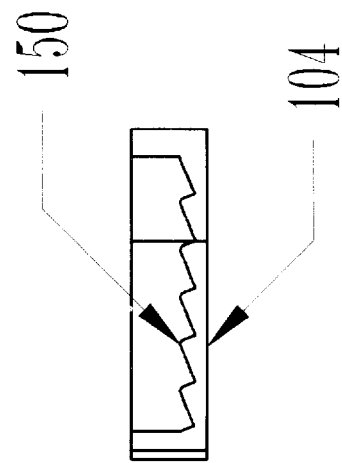
Figure 8B:
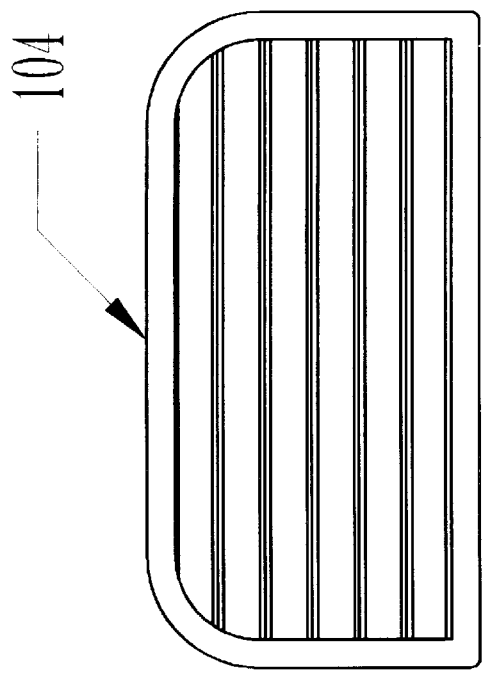
Figure 8B:
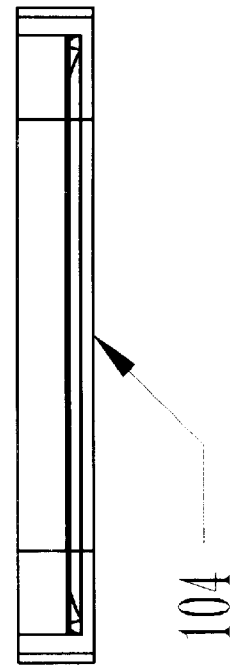

FIG. 8A is a production type drawing of an embodiment of a fly tray 104 used with the instant invention. FIG. 8B is a production type drawing of a fly tray 104 made of high density foam with ripples 150. The perimeter sidewall 108 as well as the bottom of this embodiment of the tray 104 is made of high density foam.

Figure 8E:
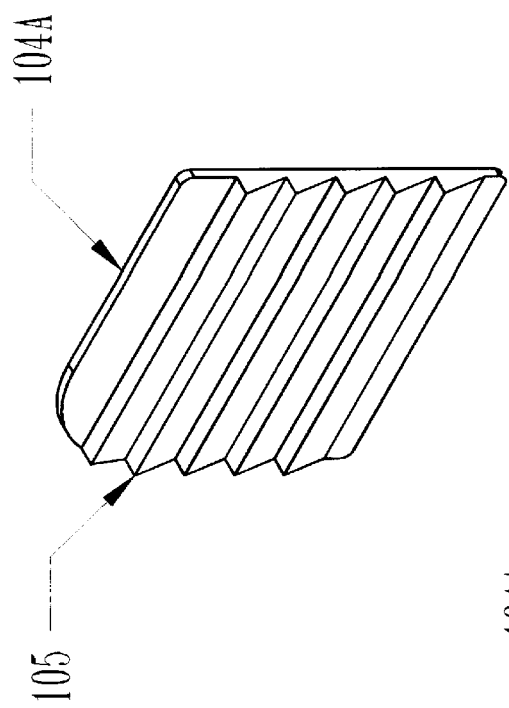
FIG. 8E is a perspective view of the foam insert shown on FIG. 8C.
Figure 8D:
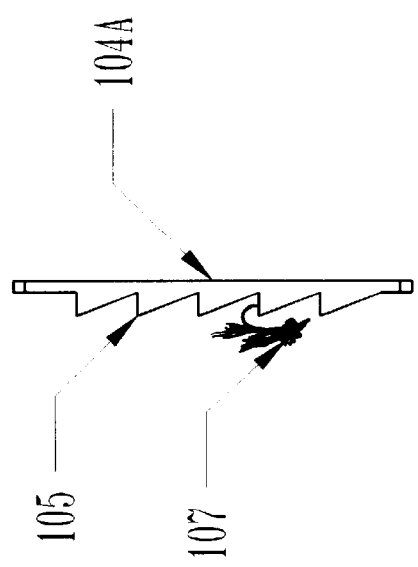
FIG. 8D is a side view of the foam insert shown on FIG. 8C.
Figure 8C:
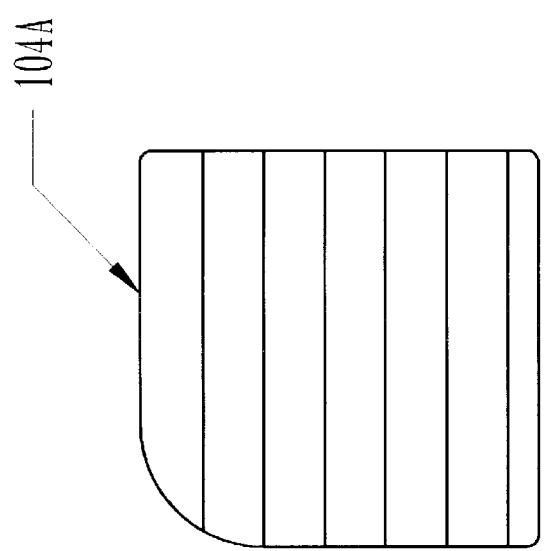
FIG. 8C is a top plan view of a production type drawing of a foam insert that has been adapted for use with a tray as shown on FIG. 8A.
Figure 8H:
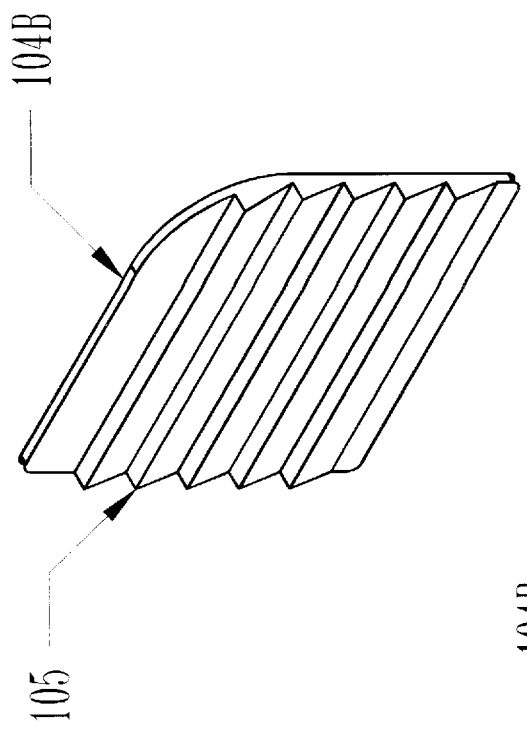
FIG. 8H is a perspective view of the foam insert shown on FIG. 8F.
Figure 8G:
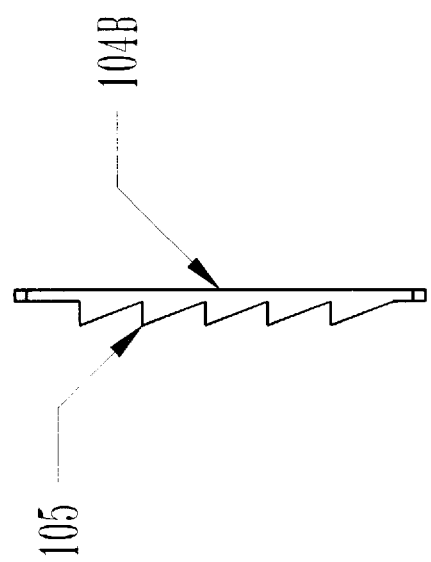
FIG. 8G is a side view of the foam insert shown on FIG. 8F.
Figure 8F:
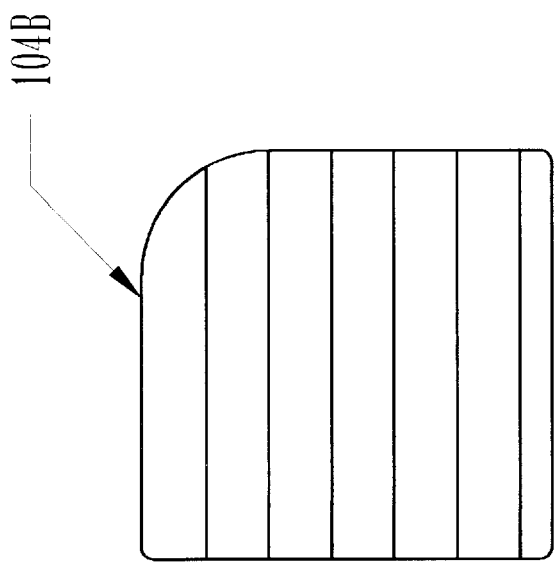
FIG. 8F is a top plan view of a production type drawing of a foam insert that has been adapted for use with a tray as shown on FIG. 8A.

FIG. 8C is a top plan view of a production type drawing of a foam insert tray 104A that has been adapted for use with a plastic tray as shown on FIG. 8A or as an independent, unitary tray made entirely from foam. In a preferred embodiment of the invention the unitary, one piece, foam trays are used due to their light weight and ease of manufacture. FIG. 8D is a side view of the foam insert or tray 104A shown on FIG. 8C, and illustrates the raised ripples 105 that are used to accept flies 107 as shown. FIG. 8E is a perspective view of the foam insert or tray 104 shown on FIG. 8C. FIG. 8F is a top plan view of a production type drawing of a foam insert or tray 104B that has been adapted for use with a tray as shown on FIG. 8A, the insert or tray 104B is a mirror image of the insert or tray 104A shown on FIG. 8C. FIG. 8G is a side view of the foam insert or tray 104B shown on FIG. 8F, and illustrates that the preferred embodiment of the tray will also include ripples 107. FIG. 8H is a perspective view of the foam insert or tray 104B shown on FIG. 8F.

Turning now to FIGS. 9B through 9G where a side view from a production type drawing of a foam insert or unitary foam tray 104C that has been adapted for use with a wallet as shown on FIG. 9 has been illustrated. As can be seen in FIG. 9C, the foam tray shown on FIG. 9B incorporates sidewalls 108 to a foam tray 104C of unitary construction. The tray 104C includes a boss 114 that serves as a support for a closure means, such as a portion of hook and loop material and to provide an area for placement of a logo or seller's brand. FIG. 9D is a sectional view of the foam tray shown on FIG. 9C taken from the location shown on FIG. 9C and illustrates the use of the ripples 105 to hold flies 107. FIG. 9E is a perspective view of the foam tray 104C shown on FIGS. 9B through 9D. FIG. 9G is an enlarged view of FIG. 9C.

Turning now to FIG. 9H where the side view of a production type drawing of a foam tray 104D that has been adapted for use with a wallet as shown on FIG. 9. The foam tray 104D includes integral, unitary sidewalls 108 as well as vertical ridges 116 and horizontal ridges 118 for mounting flies 107. FIG. 9I is a top plan view of the foam tray 104D shown on FIG. 9H. FIG. 9J is a sectional view of the foam tray 104D shown on FIG. 9I taken from the location shown on FIG. 9I. FIG. 9K is a perspective view of the foam tray 104D shown on FIGS. 9H through 9J. FIG. 9G is an enlarged view of FIG. 9I. It is important to note that the generally waffle shape or pattern of the arrangement of vertical ridges 116 relative to the horizontal ridges 118 allows the achievement of important new and useful results. More particularly, the waffle shape increases the versatility of the tray in that it allows mounting of large, salt water fishing flies in an orientation generally parallel to the longer dimensions of the tray 104D. Thus a large saltwater fishing fly 117 may be mounted from a vertical ridge 116 as shown on FIG. 9K, allowing room for the entire and preventing the crushing of sections of the fly. Also, the arrangement still allows the mounting of additional, smaller flies on one of the horizontal ridges 118. The tray shown on FIGS. 9H through 9L illustrates will be mountable in a wallet such as the wallet shown in FIG. 9, and storable in a case as shown on FIGS. 1 and 3.

Figure 7:
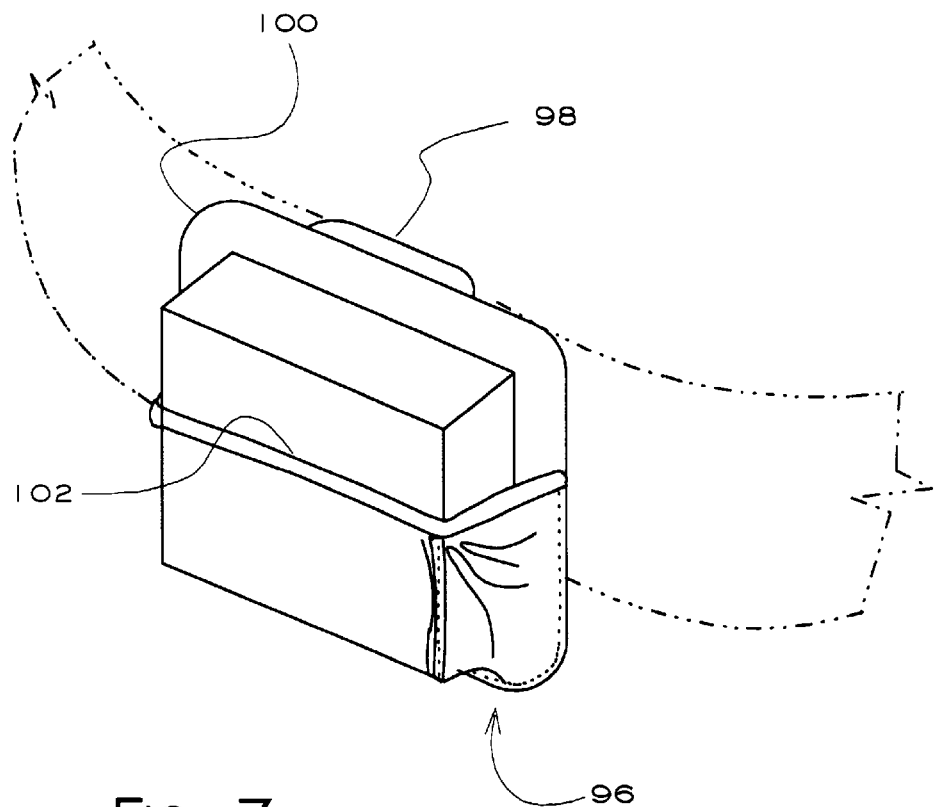
FIG. 7 is a perspective view of an embodiment of the holsters used with the instant invention.

Yet another important component that cooperates with the instant invention is shown on FIG. 7, which includes a perspective view of a holster 96 which preferably includes belt clips 98 or means for attaching the holster 96 to the users belt. Thus the preferred embodiment of the holster 96 also includes a backing 100 to which is attached the means for attaching the holster 96 to the user's belt or wader top. The holster 96 also preferably includes at least one pocket 102 which has been adapted for receiving a small fly box 58 or a large fly box 54. Clearly, the holster 96 may include several pockets for several sizes of fly boxes.

To take advantage of the wallet's 86 ability to accept interchangeable plates having a footprint 86, it its preferred that a tray 104, as illustrated in FIG. 8, be used with the system of the instant invention. As has been illustrated in FIG. 8, the tray 104 preferably includes sidewalls 108 which extend along the perimeter 110 of the tray 104. The perimeter 110 of the tray 104 should have the same shape as the footprint 89, which will allow attachment of the tray 104 on to the wallet 86. The tray 104 can preferably include fly support material such as foam or fleece within the sidewall, and thus the sidewall 108 prevents the crushing of flies held on the fly support material while the wallet 86 is closed. In a highly preferred embodiment of the tray 104, a divider wall 109 is incorporated within the sidewalls 108. The divider wall 109 adds stiffness to the tray 104, prevents crushing of flies stored within the tray 104, and nests between a pair of line leader pockets 120 which have preferably been incorporated into the wallet 86 as shown on FIG. 9. Other detailed illustrations of a configuration of the wallets is found in my design patent application Ser. No. 29/043,887, now U.S. Design Pat. No. 376,905, incorporated entirely herein by reference.

Since FIG. 9A is a production type drawing of a wallet 86 used with the instant invention, it also incorporates preferred dimensions. These dimensions enhance interchangeability and provide the best portions currently devised for the wallet 86.

As shown in FIG. 10 the reel module 62 has been adapted for receiving a fishing reel or a spare spool for a fishing reel, and is preferably incorporated to the system of the instant invention. The shown module is preferably made of resilient synthetic foam and fits within the case 50 in a manner that allows the combining of the reel module 110 with the fly box modules to fill the entire space within the case 50, in order to provide secure retention of the fishing gear carried with instant system.

As shown in FIGS. 13 through 26, the modules of the instant invention can be used to form a large variety of configurations to carry different combinations of equipment as required for the areas to be fished. For example in FIG. 13 is shown a perspective view of a large fly box module 52 attached to a small fly box module 56, and illustrating the mating function of the male track 72 and the female track 74. Accordingly, another example of a combination achievable with the instant system is shown on FIG. 14, which contains a plan view of two large fly box modules 52 attached to one another, and illustrating the mating function of the male track 72 and the female track 74.

Yet another example is shown on FIG. 15 where a plan view of two small fly box modules 56 are shown attached to one another. Similarly, in FIG. 16 is shown a plan view of a large fly box module 52 attached to a small fly box module 56. FIG. 18 illustrates a plan view of the modules shown in FIG. 1, the case of FIG. 1 is not shown in this figure.

Other examples of the versatility of the system of the instant invention are shown in FIG. 19 through 21 and 23, which include other configurations of attached modules.

Turning now to FIG. 22, which is a plan view of still yet another configuration of attached modules, this configuration is longer than previously discussed configurations, however. Note that this longer configuration can be used with a case that has correspondingly larger proportions. It is contemplated that this larger configuration be used with a larger case which includes a pocket for holding a fly rod that collapses to approximately 32 inches in length. This kind of larger configuration is also illustrated in FIG. 24, which is a plan view of another configuration of attached modules. This configuration also contemplates the use of a large case that has means, such as a pocket, for accommodating a fishing rod which collapses to 32 inches in length.

For further detail on the instant invention, FIG. 25, which is a one to one scale plan view of a large fly box module 52 and illustrates the various components of a preferred embodiment of a module. Similarly, FIG. 26 is a one to one scale plan view of a small fly box module 56, the figure also further illustrates the male track 72 and the female track 74. Still further, FIG. 27 is a one to one scale plan view of a reel module 62, which as discussed above is adapted for receiving a fishing reel or spare spool, the module is preferably made from synthetic foam block. Similarly, FIG. 28 is a one to one scale plan view of another embodiment of a module adapted for receiving a fishing reel.

FIG. 29 is diagram showing various components of the system of the instant invention and showing how each element can be interchanged with other components to customize the carrying capacity of the case and the use of the fly boxes and modules with various components, such as the waist pack 76, the holsters 96 which clip on to the user's belt, the wallets 86, and the interchangeable plates 84.

As indicated above, important component of the system disclosed herein is the inclusion of the fishing wallet 86 which can be attached to the front of a user's chest waders and/or hung from a user's neck, over his chest. Thus in a preferred embodiment of the wallet 86, the wallet 86 is made from a flat pliable material of dimensions shown on FIG. 9A, and capable of being folded along line 112. The means for removably accepting these interchangeable plates may preferably be hook and loop type material of the type commonly sold under the trademark Velcro.

Thus it is important to note that the user may change the configuration of the inside of the wallets 86 form one which holds a fly tray 104 to one which holds an interchangeable plate 84 which includes a pocket 94 for a standard fly box.

Also, it is important to note that by providing a foldable wallet 86 that can be hung around the user's neck, one can also use the same configuration of the wallet to provide a working surface for the fisherman by simply providing a strap that limits the unfolding of the wallet 86 to a position where the unfolding side of the wallet forms a surface that is substantially perpendicular to the user's chest, and thereby forming a work surface for the user.

As mentioned earlier, another important aspect of the system is that by using modules with means for interconnecting the modules to one another, one may further enhance the usefulness and versatility of the system by simply adding at least one set of leg supports adapted for attachment to the modules. The leg supports would attach to the means for interconnecting the modules, and thus forming a miniature chest with drawers formed by the fly boxes. This miniature chest provides the fisherman with a convenient holding device to keep the fly boxes organized while he works on modifying his existing flies to better match insects and other fish food in the area. Once the fisherman is finished with the modifications to the flies, a process which is commonly referred to as "dressing up" the flies.

Turning now to FIGS. 30 and 31, where a float tube 120 has been adapted for use with the instant invention. The float tube 120 includes a case support 122 that fits over a float tube, a pontoon, or similar flotation device. A case similar to case 50 could be mounted on the float tube 120 and trays of the system taught herein can thus be selected and used with case support while fishing from the floatation device.

FIG. 31 illustrates the use of the system with a pocket 124 on the float tube. The pocket being adapted for receiving modules, such as the large fly box module 52 at one side of the pocket and having a lid or cover 126 that accepts the trays as taught herein. In use, a fisherman would open the lid 126 and place a desired tray on the lid 126 and use the lid 126 as a working surface together with the tray. Thus FIGS. 30 and 31 illustrate the versatility of the system taught herein and the of the system taught herein.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A system for carrying fishing equipment to the field to be used when fishing, the system comprising:
    a module comprising a means for attaching to another module and a means for accepting a container;
    a tray adapted for accepting fishing equipment;
    a case adapted for receiving a plurality of said modules attached to one another;
    a wallet adapted for accepting said tray, so that the tray can be transported in the case and then removed and placed in the wallet to be used when fishing.

2. A system according to claim 1 and further comprising a pack adapted for accepting a module, so that the module transported in the case can be supported in the pack while fishing.

3. A system according to claim 1 and further comprising at least one module adapted for accepting said wallet, the module adapted for accepting the wallet having means for attaching to another module.

4. A system according to claim 1 wherein said tray comprises a section of ripple foam.

5. A system according to claim 1 wherein said tray comprises a support plate having at least one flexible pocket adapted for accepting a fly box.

6. A system according to claim 1 and further comprising a holster adapted for accepting a container, so that a container carried in said module can be removed from the module and carried in the holster while fishing.

7. A system according to claim 1 wherein said wallet further comprises means for supporting the wallet from a person's body.

8. A system for carrying fishing equipment to the field to be used when fishing, the system comprising:
    a module comprising a means for attaching to another module and a means for accepting a container;
    a case adapted for receiving said module;
    a wallet adapted to be held within said case; and
    a tray for accepting fishing equipment and being adapted for mounting in the wallet, so that the tray can be transported in the case and then removed and placed in the wallet to be used when fishing.

9. A system according to claim 8 and further comprising a pack adapted for accepting a module, so that the module transported to a fishing site in the case can then be supported in the pack while fishing.

10. A system according to claim 8 wherein said tray comprises a section of ripple foam.

11. A system according to claim 8 wherein said tray comprises a support plate having at least one flexible pocket adapted for accepting at least one container.

12. A system according to claim 8 and further comprising a holster adapted for accepting a container, so that a container carried in said module can be removed from the module and carried in the holster while fishing.

13. A system according to claim 8 wherein said wallet further comprises means for supporting the wallet from a person's body.

14. A system for carrying fishing flies to the field to be used when fishing, the system comprising:

at least two modules, each module comprising a means for attaching to another module and a means for accepting a container;

a case adapted for accepting said modules;

a wallet adapted to be held within said case; and a tray for accepting fishing flies and being adapted for mounting in the wallet, so that the tray can be transported in the case and then mounted in the wallet to be used when fishing.

15. A system according to claim 8 and further comprising a pack adapted for accepting a module, so that the module transported in the case can be supported in the pack while fishing.

16. A system according to claim 8 wherein said wallet is further adapted for mounting in one of the modules.

17. A system according to claim 16 wherein said tray comprises a section of ripple foam.

18. A system according to claim 16 wherein said tray comprises a support plate having at least one flexible pocket adapted for accepting a fly box.

19. A system according to claim 16 and further comprising a holster adapted for accepting a container, so that a container carried in said module can be removed form the module and carried in the holster while fishing.

20. A system according to claim 16 wherein said wallet further comprises means for supporting the wallet from a person's body.

\* \* \* \* \*